United States Patent
Kiuchi et al.

[11] Patent Number: 6,108,677
[45] Date of Patent: *Aug. 22, 2000

[54] DATA PROCESSING APPARATUS

[75] Inventors: Hiroyoshi Kiuchi, Hachioji; Toshio Tohara, Ome, both of Japan

[73] Assignee: Casio Computer Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/547,712

[22] Filed: Oct. 19, 1995

[30] Foreign Application Priority Data

Nov. 8, 1994 [JP] Japan .................... 6-298892

[51] Int. Cl.⁷ .................................................. G06F 17/30
[52] U.S. Cl. ........................................ 707/613; 707/517
[58] Field of Search ..................... 395/611, 612, 395/613, 614, 615, 230, 235, 245, 201; 707/100, 101, 102, 103, 104, 517

[56] References Cited

U.S. PATENT DOCUMENTS

| | | | |
|---|---|---|---|
| 4,852,019 | 7/1989 | Vinberg et al. | 364/521 |
| 5,093,779 | 3/1992 | Sakurai | 395/600 |
| 5,201,047 | 4/1993 | Maki et al. | 395/600 |
| 5,202,984 | 4/1993 | Kashio | 707/200 |
| 5,228,100 | 7/1993 | Takeda et al. | 382/175 |
| 5,247,666 | 9/1993 | Buckwold | 395/600 |
| 5,257,365 | 10/1993 | Powers et al. | 395/600 |
| 5,280,609 | 1/1994 | MacPhail | 395/600 |
| 5,283,892 | 2/1994 | Nakane et al. | 395/600 |
| 5,297,280 | 3/1994 | Potts, Sr. et al. | 395/600 |
| 5,301,313 | 4/1994 | Terada et al. | 395/600 |
| 5,333,315 | 7/1994 | Saether et al. | 395/600 |
| 5,359,724 | 10/1994 | Earle | 395/425 |
| 5,412,190 | 5/1995 | Josephson et al. | 395/245 |
| 5,504,676 | 4/1996 | Domen et al. | 395/230 |
| 5,526,518 | 6/1996 | Kashio | 707/1 |
| 5,537,591 | 7/1996 | Oka | 395/613 |
| 5,623,658 | 4/1997 | Kiuchi et al. | 707/101 |
| 5,642,521 | 6/1997 | Kiuchi et al. | 707/517 |
| 5,765,167 | 6/1998 | Kiuchi et al. | 707/200 |

*Primary Examiner*—Thomas G. Black
*Assistant Examiner*—Ruay Lian Ho
*Attorney, Agent, or Firm*—Frishauf, Holtz, Goodman, Langer & Chick

[57] ABSTRACT

A data processing apparatus includes a slip file for storing slip records each including item data corresponding to individual item names of the slip records, and a data file for storing data records in correspondence with individual item names of the data records. A memory stores a correlation table showing a correlation between individual item names of the slip records and individual item names of the data records to be processed at a time of renewal of the slip records. At renewal of the data records in the data file, the item data of each of the slip records in the slip file are arranged to correspond with an arrangement of each of the data records in the data file, in accordance with the correlation table stored in the memory, to thereby generate records for renewal. The data records in the data file are then renewed in accordance with the generated records for renewal.

16 Claims, 26 Drawing Sheets

FIG.2A LEDGER REGISTRATION SLIP (TRANSFER SCHEDULE)

|   | A | B | C | D |
|---|---|---|---|---|
| 1 | RENEWAL DATE | | 1994/09/15 15:04 | |
| 2 | NUMBER OF RECORDS | | 3,234,567 | |
| 3 | LEDGER NAME | | | |
| 4 | ACCOUNTING SHEDULE | | | |
| 5 | | | | |
| 6 | | | | |
| 7 | ITEM NAME | ATTRIBUTE | NUMBER OF DIGITS | TABLE NAME |
| 8 | TRANSACTION TERM | R | 4 | |
| 9 | SLIP TYPE | R | 2 | |
| 10 | SLIP no | R | 5 | |
| 11 | TRANSACTION DATE | | 8 | |
| 12 | ISSUINGCOMPANY cd | | 3 | |
| 13 | PERSON IN CHARGE no | | 5 | |
| 14 | AMOUNT | N | 13.0 | |
| 15 | DEBIT ACCOUNT cd | | 4 | ACCOUNT tb |
| 16 | DEBIT BANK cd | | 3 | BANK tb |
| 17 | DEBITOR cd | | 8 | CUSTMER tb |
| 18 | DEBIT ACCOUNTING cd | | 2 | |
| 19 | DEBITOR'S SECTION no | | 3 | |
| 20 | CREDIT ACCOUNT cd | | 4 | ACCOUNT tb |
| 21 | CREDIT BANK cd | | 3 | BANK tb |
| 22 | CREDITOR cd | | 8 | CUSTMER tb |
| 23 | CREDIT ACCOUNTING cd | | 2 | |
| 24 | CREDITOR'S DEPARTMENT cd | | 3 | |
| 25 | PURCHASE'S DEPARTMENT cd | | 2 | |
| 26 | REMITTOR/ REMITTEE cd | | 8 | |
| 27 | REMITTOR/ REMITTEE NAME | | 20 | |
| 28 | EXPLANATION | | 40 | |
| 29 | REGISTRATION DATE | | 8 | |
| 30 | ISSUING COMPANY NAME | | 20 | |
| 31 | DEBIT INTERNAL ACCOUNT cd | | 6 | |
| 32 | CREDIT INTERNAL ACCOUNT cd | | 6 | |

FIG.2C

|   | E | F | G | H |
|---|---|---|---|---|
| 1 | | RENEWED DATE | 1994/09/07 18:13 | 1994/09/04 17:50 |
| 2 | | NUMBER OF ENTRY | 2,107 | 1,206 |
| 3 | | INPUT LEDGER NAME | TRANSFER SLIP | TRAVELING EXPENSE REPORT |
| 4 | | JOB NAME | TRANSFER SLIP ENTRY | TRAVELING EXPENSE REPORT ENTRY |
| 5 | | FUNCTION NAME | SLIP | SLIP |
| 6 | | RENEWAL TYPE | ADD | ADD |
| 7 | | DEFINITION | SLIP ITEM | SLIP ITEM |
| 8 | | | #DIVISION(DATE,1,6) | #DIVISION(EXPENSE REPORTING DATE,1,6) |
| 9 | | | "62" | "63" |
| 10 | | | SLIP | SLIP |
| 11 | | | DATE | EXPENSE REPORTING DATE |
| 12 | | | ISSUING COMPANY | BELONGING COMPANY |
| 13 | | | PERSON IN CHARGE no | EMPLOYEE cd |
| 14 | | | AMOUNT | EXPENSE AMOUNT |
| 15 | | | DEBIT ACCOUNT | "4567" |
| 16 | | | DEBIT BANK | |
| 17 | | | DEBITOR | |
| 18 | | | DEBIT ACCOUNTING | ACCOUNTING cd |
| 19 | | | DEBTOR'S SECTION | DEPARTMENT cd |
| 20 | | | CREDIT ACCOUNT | "1111" |
| 21 | | | CREDIT BANK cd | |
| 22 | | | CREDITOR cd | |
| 23 | | | CREDIT ACCOUNTING | ACCOUNTING cd |
| 24 | | | CREDITOR'S DEPARTMENT | DEPARTMENT cd |
| 25 | | | | |
| 26 | | | | EMPLOYEE cd |
| 27 | | . | | NAME |
| 28 | | | EXPLANATION | EXPLANATION |
| 29 | #CURRENT DAY | | | |
| 30 | #INDEX(ISSUING COMPANY cd, COMPANY NAME) | | | |
| 31 | #INDEX(ACCOUNT tb, DEBIT ACCOUNT cd, INTERNAL ACCOUNT cd) | | | |
| 32 | #INDEX(ACCOUNT tb, CREDIT ACCOUNT cd, INTERNAL ACCOUNT cd) | | | |

| | A | B | C | D |
|---|---|---|---|---|
| 1 | RENEWAL DATE | | 1994/09/09 22:10 | |
| 2 | NUMBER OF RECORDS | | 393,321 | |
| 3 | LEDGER NAME | | | |
| 4 | OPERATING SHEDULE | | | |
| 5 | | | | |
| 6 | | | | |
| 7 | ITEM NAME | ATTRIBUTE | NUMBER OF DIGITS | TABLE NAME |
| 8 | TRANSACTION TERM | R | 6 | |
| 9 | TRANSACTION TYPE | R | 2 | |
| 10 | SLIP no | R | 4 | |
| 11 | LINE no | R | 2 | |
| 12 | TRANSACTION DATE | | 8 | |
| 13 | CUSTOM COMPANY cd | | 3 | COMPANY tb |
| 14 | PERSON IN CHARGE no | | 5 | EMPLOYEE tb |
| 15 | NAME OF PERSON IN CHARGE | | 20 | |
| 16 | CUSTOMER cd | | 8 | COSTOMER tb |
| 17 | CUSTOMER/SUPPLIER COMPANY cd | | 3 | COMPANY tb |
| 18 | PRODUCT PART cd | | 8 | PRODUCT tb |
| 19 | PRODUCT STATUS SECTION | | 1 | |
| 20 | PRODUCT PART NAME | | 20 | |
| 21 | PRODUCT STANDARD NAME | | 20 | |
| 22 | TRANSACTION SECTION | | 1 | |
| 23 | TRANSACTION QUANTITY | N | 9.0 | |
| 24 | TRANSACTION UNIT COST | N | 11.2 | |
| 25 | TRANSACTION AMOUNT | N | 13.0 | |
| 26 | WAREHOUSE | | 5 | WAREHOUSE tb |
| 27 | CUSTOMER/SUPPLIER WAREHOUSE cd | | 5 | WAREHOUSE tb |
| 28 | EXPLANATION | | 20 | |
| 29 | REGISTRATION DATE | | 8 | |
| 30 | CUSTOMER COMPANY NAME | | 20 | |
| 31 | PRODUCT CLASSIFICATION | | 2 | |
| 32 | PRODUCT MATERIALS COST | N | 11.0 | |
| 33 | PRODUCT OUTSIDE PROCESSING COST | N | 11.0 | |
| 34 | PRODUCT PREDICTED COST | N | 11.0 | |

FIG.3C

| | E | F | G | H | I | J |
|---|---|---|---|---|---|---|
| 1 | | RENEWED DATE | 1994/09/02 14:00 | 1994/09/01 17:15 | 1994/09/04 12:15 | 1994/09/06 09:54 |
| 2 | | NUMBER OF ENTRY | 5,602 | 4,517 | 1,216 | 3,321 |
| 3 | | INPUT LEDGER NAME | SALES SLIP | PURCHASE SLIP | MOVE-BETWEEN WAREHOUSE SLIP | LENDING SLIP |
| 4 | | JOB NAME | SALES SLIP ENTRY | PURCHASE SLIP ENTRY | WAREHOUSE MOVING ENTRY | LENDING SLIP ENTRY |
| 5 | | FUNCTION NAME | SLIP | SLIP | SLIP | SLIP |
| 6 | | RENEWAL TYPE | ADD | ADD | ADD | ADD |
| 7 | DEFINITION | | SLIP ITEM | SLIP ITEM | SLIP ITEM | SLIP ITEM |
| 8 | #DIVISION(TRANSACTION DATE,1,6) | | | | | |
| 9 | | | "20" | "34" | "51" | "53" |
| 10 | | | SLIP NO | SLIP NO | SLIP NO | SLIP NO |
| 11 | | | LINE NO. | LINE NO. | LINE NO. | LINE NO. |
| 12 | | | ISSUING DATE | ISSUING DATE | ISSUING DATE | LENDING DATE |
| 13 | | | PLACE | PLACE | PLACE | PLACE |
| 14 | | | PERSON IN CHARGE NO. | PERSON IN CHARGE NO. | PERSON IN CHARGE NO. | PERSON IN CHARGE NO. |
| 15 | | | NAME OF PERSON IN CHARGE | NAME OF PERSON IN CHARGE | NAME OF PERSON IN CHARGE | NAME OF PERSON IN CHARGE |
| 16 | #DIVISION(TRANSACTION DATE,1,6) | | CUSTOM CODE | SUPPLIER CODE | | BORROWER CODE |
| 17 | | | | | PLACE OF RECEIVER | |
| 18 | | | PRODUCT CODE | PRODUCT CODE | PRODUCT CODE | PRODUCT CODE |
| 19 | | | STATUS | STATUS | STATUS | STATUS |
| 20 | | | PRODUCT NAME | PRODUCT NAME | PRODUCT NAME | PRODUCT NAME |
| 21 | | | PRODUCT STANDARD NAME | PRODUCT STANDARD NAME | PRODUCT STANDARD NAME | PRODUCT STANDARD NAME |
| 22 | | | SALES SECTION | PURCHASE SECTION | MOVING SECTION | LENDING SECTION |
| 23 | | | QUANTITY | QUANTITY | QUANTITY | QUANTITY |
| 24 | | | COST | COST | | |
| 25 | | | AMOUNT | AMOUNT | | |
| 26 | | | SHIPPING WAREHOUSE | RECEIVING WAREHOUSE | RECEIVING WAREHOUSE | SHIPPING WAREHOUSE |
| 27 | | | | | SHIPPING WAREHOUSE | |
| 28 | | | EXPLANATION | EXPLANATION | EXPLANATION | EXPLANATION |
| 29 | #CURRENT DAY | | | | | |
| 30 | #INDEX(CUSTOMER COMPANY NAME cd,COMPANY NAME) | | | | | |
| 31 | #INDEX(PRODUCT tbh, PRODUCT cd, PRODUCT CLASSIFICATION) | | | | | |
| 32 | #INDEX(PRODUCT UNIT PRICE tbh, PRODUCT cd, MATERIAL COST) | | | | | |
| 33 | #INDEX(PRODUCT UNIT PRICE tbh, PRODUCT cd, PROCESSING COST) | | | | | |
| 34 | #INDEX(PRODUCT cd, PREDICTED COST) | | | | | |

FIG.4A LEDGER REGISTRATION SLIP (ACCOUNT SCHEDULE)

| | A | B | C | D |
|---|---|---|---|---|
| 1 | RENEWAL DATE | | 1994/09/15 15:04 | |
| 2 | NUMBER OF RECORDS | | 3,234,567 | |
| 3 | LEDGER NAME | | | |
| 4 | ACCOUNTING SHEDULE | | | |
| 5 | | | | |
| 6 | | | | |
| 7 | ITEM NAME | ATTRIBUTE | NUMBER OF DIGITS | TABLE NAME |
| 8 | TRANSACTION TERM | R | 6 | |
| 9 | seg | R | 9 | |
| 10 | SLIP TYPE | | 2 | |
| 11 | SLIP no | | 5 | |
| 12 | TRANSACTION DATE | | 8 | |
| 13 | COMPANY cd | | 3 | COMPANY tb |
| 14 | ACCOUNT cd | | 4 | ACCOUNT tb |
| 15 | PERSON IN CHARGE no | | 5 | EMPLOYEE tb |
| 16 | DEBIT/CREDIT SECTION | | 1 | |
| 17 | CREDIT AMOUNT | N | 13.0 | |
| 18 | DEBIT AMOUNT | N | 13.0 | |
| 19 | MANAGEMENT no | | 10 | |
| 20 | EXPLANATION | | 20 | |
| 21 | ACCOUNT UNIT | | 2 | ACCOUNTING cdtb |
| 22 | DEPARTMENT cd | | 3 | |
| 23 | BANK cd | | 3 | BANK tb |
| 24 | CUSTOMER cd | | 8 | CUSTMER tb |
| 25 | CUSTOMER NAME | | 20 | |
| 26 | CUSTOMER/SUPPLIER ACCOUNT cd | | 1 | ACCOUNT tb |
| 27 | CUSTOMER/SUPPLIER COMPANY cd | | 3 | COMPANY tb |
| 28 | CUSTOMER/SUPPLIER ACCOUNTING UNIT | | 2 | ACCOUNTING cdtb |
| 29 | CUSTOMER/SUPPLIER SECTION cd | | 3 | |
| 30 | CUSTOMER/SUPPLIER BANK cd | | 3 | BANK tb |
| 31 | CUSTOMER/SUPPLIER cd | | 8 | CUSTMER tb |
| 32 | CUSTOMER/SUPPLIER NAME | | 20 | |
| 33 | REGISTRATION DATE | | 8 | |
| 34 | COMPANY | | 20 | |
| 35 | CUSTOMER/SUPPLIER COMPANY NAME | | 20 | |

FIG.4C

| | E | F | G | H | I | J |
|---|---|---|---|---|---|---|
| 1 | | RENEWED DATE | | 1994/09/12 09:43 | | 1994/09/09 22:10 |
| 2 | | NUMBER OF ENTRY | | 842,345 | | 393,321 |
| 3 | | INPUT LEDGER NAME | TRANSFER SCHEDULE | | SALES SCHEDULE | |
| 4 | | JOB NAME | TRANSFER SCHEDULE POSTING | | SALES SLIP JOURNAL | |
| 5 | | FUNCTION NAME | | | JOURNAL | |
| 6 | | RENEWAL TYPE | ADD | | ADD | |
| 7 | | DEFINITION | DEBIT | CREDIT | DEBIT | CREDIT |
| 8 | | | TRANSACTION TERM | TRANSACTION TERM | TRANSACTION TERM | TRANSACTION TERM |
| 9 | #SLIP SEQUENTIAL NO. | | | | | |
| 10 | | | SLIP TYPE | SLIP TYPE | TRANSACTION TYPE | SLIP TYPE |
| 11 | | | SLIP no | SLIP no | SLIP no | SLIP no |
| 12 | | | TRANSACTION DATE | TRANSACTION DATE | TRANSACTION DATE | TRANSACTION DATE |
| 13 | | | ISSUING COMPANY | ISSUING COMPANY | CUSTOMER COMPANY cd | CUSTOMER COMPANY cd |
| 14 | | | DEBIT ACCOUNT cd | CREDIT ACCOUNT cd | $CREDIT ACCOUNT cd | $DEBIT ACCOUNT cd |
| 15 | | | PERSON IN CHARGE no | PERSON IN CHARGE no | PERSON IN CHARGE no | PERSON IN CHARGE no |
| 16 | | | | | | |
| 17 | | | AMOUNT | 0 | @AMOUNT | 0 |
| 18 | | | 0 | AMOUNT | 0 | @AMOUNT |
| 19 | | | | | | |
| 20 | | | EXPLANATION | EXPLANATION | EXPLANATION | EXPLANATION |
| 21 | | | DEBIT ACCOUNTING cd | CREDIT ACCOUNTING cd | | |
| 22 | | | DEBTOR'S SECTION cd | CREDITOR'S SECTION cd | | |
| 23 | | | DEBIT BANK cd | CREDIT BANK cd | | |
| 24 | | | DEBITOR cd | CREDITOR cd | CUSTOMER cd | CUSTOMER cd |
| 25 | #INDEX(CUSTOMER tb, CUSTOMER cd, CUSTMER NAME) | | | | | |
| 26 | | | CREDIT ACCOUNT cd | DEBIT ACCOUNT cd | $CREDIT ACCOUNT cd | $DEBIT ACCOUNT cd |
| 27 | | | ISSUING COMPANY cd | ISSUING COMPANY cd | CUSTOMER COMPANY cd | CUSTOMER COMPANY cd |
| 28 | | | CREDIT ACCOUNTING cd | DEBIT ACCOUNTING cd | | |
| 29 | | | CREDITOR'S DEPARTMENT cd | DEBITOR'S DEPARTMENT cd | | |
| 30 | | | CREDIT BANK cd | DEBIT BANK cd | | |
| 31 | | | CREDITOR cd | DEBITOR cd | CUSTOMER cd | CUSTOMER cd |
| 32 | #INDEX(CUSTOMER tb, CUSTOMER/ SUPPLIER cd, CUSTMER NAME) | | | | | |
| 33 | | | REGISTRATION DATE | REGISTRATION DATE | REGISTRATION DATE | REGISTRATION DATE |
| 34 | #INDEX(COMPANY tb, COMPANYcd, COMPANY NAME) | | | | | |
| 35 | #INDEX(COMPANY tb, CUSTOMER/SUPPLIER COMPANYcd, COMPANY NAME) | | | | | |

FIG.5
JOURNAL (SALES SLIP JOURNAL)

| | A | B | C | D | E | F | G |
|---|---|---|---|---|---|---|---|
| 1 | | INPUT LEDGER | | | OUTPUT LEDGER | | |
| 2 | | OPERATING SCHEDULE | | | ACCOUNT SCHEDULE | | |
| 3 | | INPUT CONDITION | | | CREDIT ACCOUNT | | |
| 4 | SEQUENTIAL NUMBER | TRANSACTION TYPE | TRANSACTION SECTION | CUSTOMER | DEBIT ACCOUNT | GENERATED ITEM | @AMOUNT |
| 5 | 01 | 20 | 1 | 70002145 | 1161 | 5221 | TRANSACTION AMOUNT |
| 6 | 02 | 20 | 2 | 70002145 | 5221 | 1161 | TRANSACTION AMOUNT*(-1) |
| 7 | 03 | 20 | 3 | 70002145 | 5221 | 1161 | TRANSACTION AMOUNT*(-1) |
| 8 | 04 | 20 | 1 | * | 1161 | 5111 | TRANSACTION AMOUNT |
| 9 | 05 | 20 | 2 | * | 5171 | 1161 | TRANSACTION AMOUNT*(-1) |
| 10 | 06 | 20 | 3 | * | 5161 | 1161 | TRANSACTION AMOUNT*(-1) |
| 11 | 07 | 20 | 6 | * | 1161 | 5111 | TRANSACTION AMOUNT |
| 12 | 08 | 20 | 7 | * | 5171 | 1161 | TRANSACTION AMOUNT*(-1) |

| | A | B | C | D |
|---|---|---|---|---|
| 1 | LEDGER NAME | | | |
| 2 | | | | |
| 3 | | | | |
| 4 | | | | |
| 5 | ITEM NAME | ATTRIBUTE | NUMBER OF DIGITS | TABLE NAME |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |
| 16 | | | | |
| 17 | | | | |
| 18 | | | | |
| 19 | | | | |
| 20 | | | | |
| 21 | | | | |
| 22 | | | | |
| 23 | | | | |
| 24 | | | | |
| 25 | | | | |
| 26 | | | | |
| 27 | | | | |
| 38 | | | | |
| 29 | | | | |
| 30 | | | | |

FIG.9C

| | E | F | G | H |
|---|---|---|---|---|
| 1 | | INPUT LEDGER NAME | | |
| 2 | | JOB NAME | | |
| 3 | | FUNCTION NAME | | |
| 4 | | RENEWAL TYPE | | |
| 5 | DEFINITION | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |
| 16 | | | | |
| 17 | | | | |
| 18 | | | | |
| 19 | | | | |
| 20 | | | | |
| 21 | | | | |
| 22 | | | | |
| 23 | | | | |
| 24 | | | | |
| 25 | | | | |
| 26 | | | | |
| 27 | | | | |
| 38 | | | | |
| 29 | | | | |
| 30 | | | | |

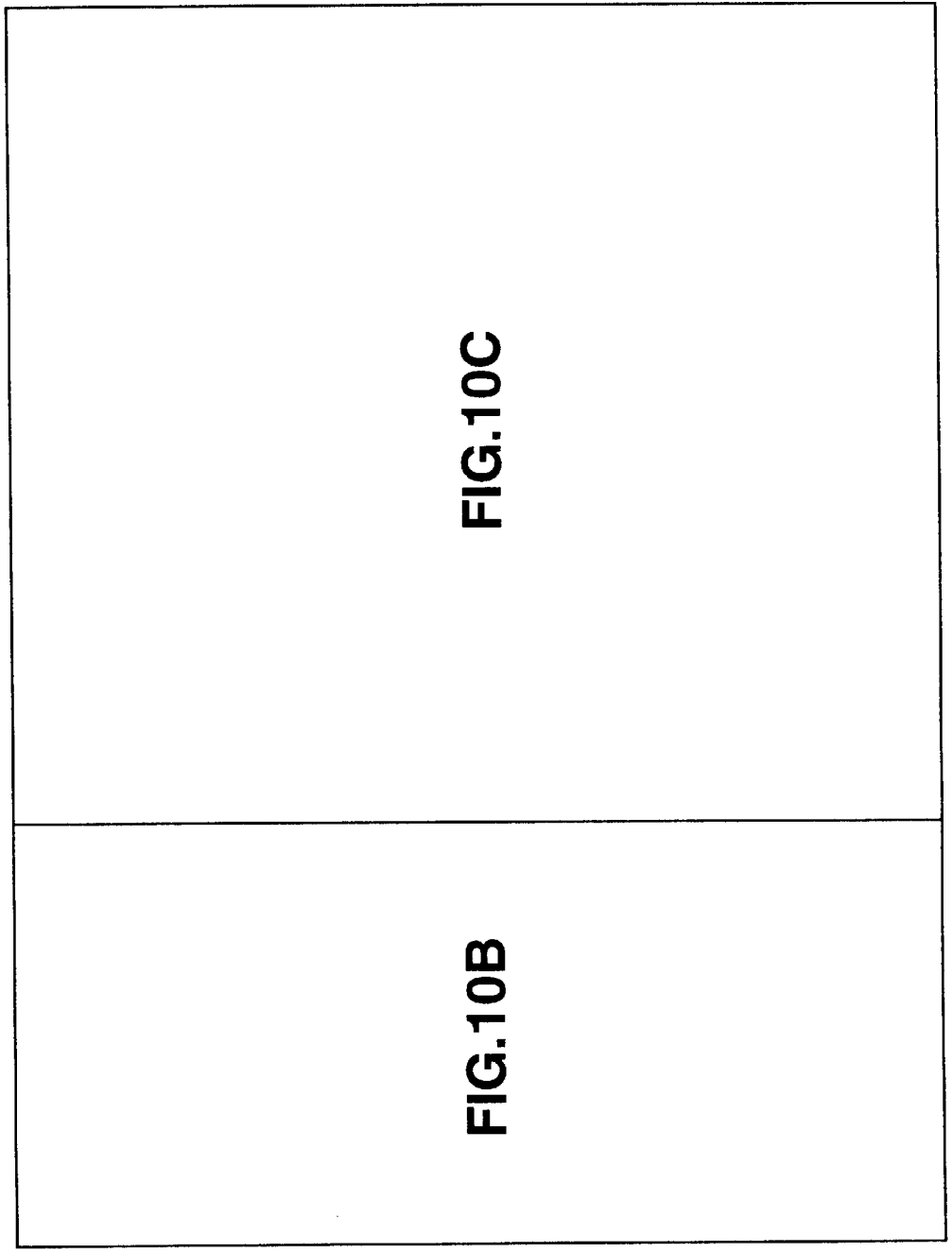
FIG.10A FILE ID TABLE (OPERATING SCHEDULE)

FIG.10B

| LEDGER NAME | | | |
|---|---|---|---|
| OPERATING SHEDULE | | | |
| ITEM NAME | ATTRIBUTE | NUMBER OF DIGITS | TABLE NAME |
| TRANSACTION TERM | R | 6 | |
| TRANSACTION TYPE | R | 2 | |
| SLIP no | R | 4 | |
| LINE no | R | 2 | |
| TRANSACTION DATE | | 8 | |
| CUSTOM COMPANY cd | | 3 | COMPANY tb |
| PERSON IN CHARGE no | | 5 | EMPLOYEE tb |
| NAME OF PERSON IN CHARGE | | 20 | |
| CUSTOMER cd | | 8 | COSTOMER tb |
| CUSTOMER/SUPPLIER COMPANY cd | | 3 | COMPANY tb |
| PRODUCT PART cd | | 8 | PRODUCT tb |
| PRODUCT STATUS SECTION | | 1 | |
| PRODUCT PART NAME | | 20 | |
| PRODUCT STANDARD NAME | | 20 | |
| TRANSACTION SECTION | | 1 | |
| TRANSACTION QUANTITY | N | 9.0 | |
| TRANSACTION UNIT COST | N | 11.2 | |
| TRANSACTION AMOUNT | N | 13.0 | |
| WAREHOUSE | | 5 | WAREHOUSE tb |
| CUSTOMER/SUPPLIER WAREHOUSE cd | | 5 | WAREHOUSE tb |
| EXPLANATION | | 20 | |
| REGISTRATION DATE | | 8 | |
| CUSTOMER COMPANY NAME | | 20 | |
| PRODUCT CLASSIFICATION | | 2 | |
| PRODUCT MATERIALS COST | N | 11.0 | |
| PRODUCT OUTSIDE PROCESSING COST | N | 11.0 | |
| PRODUCT PREDICTED COST | N | 11.0 | |

FIG.10C

| INPUT LEDGER NAME | SALES SLIP | PURCHASE SLIP | MOVE-BETWEEN WAREHOUSE SLIP | LENDING SLIP |
|---|---|---|---|---|
| JOB NAME | SALES SLIP ENTRY | PURCHASE SLIP ENTRY | WAREHOUSE MOVING ENTRY | LENDING SLIP ENTRY |
| FUNCTION NAME | SLIP | SLIP | SLIP | SLIP |
| RENEWAL TYPE | ADD | ADD | ADD | ADD |
| DEFINITION | SLIP ITEM | SLIP ITEM | SLIP ITEM | SLIP ITEM |
| #DIVISION(TRANSACTION DATE,1,6) | | | | |
| | "20" | "34" | "51" | "53" |
| | SLIP NO | SLIP NO | SLIP NO | SLIP NO |
| | LINE NO. | LINE NO. | LINE NO. | LINE NO. |
| | ISSUING DATE | ISSUING DATE | ISSUING DATE | LENDING DATE |
| | PLACE | PLACE | PLACE | PLACE |
| | PERSON IN CHARGE NO. | PERSON IN CHARGE NO. | PERSON IN CHARGE NO. | PERSON IN CHARGE NO. |
| | NAME OF PERSON IN CHARGE | NAME OF PERSON IN CHARGE | NAME OF PERSON IN CHARGE | NAME OF PERSON IN CHARGE |
| | CUSTOM CODE | SUPPLIER CODE | | BORROWER CODE |
| | | | PLACE OF REVEIVER | |
| | PRODUCT CODE | PRODUCT CODE | PRODUCT CODE | PRODUCT CODE |
| | STATUS | STATUS | STATUS | STATUS |
| | PRODUCT NAME | PRODUCT NAME | PRODUCT NAME | PRODUCT NAME |
| | PRODUCT STANDARD NAME | PRODUCT STANDARD NAME | PRODUCT STANDARD NAME | PRODUCT STANDARD NAME |
| | SALES SECTION | PURCHASE SECTION | MOVING SECTION | LENDING SECTION |
| | QUANTITY | QUANTITY | QUANTITY | QUANTITY |
| | COST | COST | | |
| | AMOUNT | AMOUNT | | |
| | SHIPPING WAREHOUSE | RECEIVING WAREHOUSE | RECEIVING WAREHOUSE | SHIPPING WAREHOUSE |
| | | | SHIPPING WAREHOUSE | |
| | EXPLANATION | EXPLANATION | EXPLANATION | EXPLANATION |
| #CURRENT DAY | | | | |
| #INDEX(CUSTOMER COMPANY NAME cd,COMPANY NAME) | | | | |
| #INDEX(PRODUCT tbh, PRODUCT cd, PRODUCT CLASSIFICATION) | | | | |
| #INDEX(PRODUCT UNIT PRICE tbh, PRODUCT cd, MATERIAL COST) | | | | |
| #INDEX(PRODUCT UNIT PRICE tbh, PRODUCT cd, PROCESSING COST) | | | | |
| #INDEX(PRODUCT cd, PREDICTED COST) | | | | |

FIG.11
FILE ID TABLE (OPERATING SCHEDULE)

| LEDGER NAME | | INPUT LEDGER NAME | | | |
|---|---|---|---|---|---|
| OPERATING SHEDULE | | SALES SLIP | PURCHASE SLIP | MOVE-BETWEEN WAREHOUSE SLIP | LENDING SLIP |
| ITEM NAME | TABLE NAME | SLIP ITEM | SLIP ITEM | SLIP ITEM | SLIP ITEM |
| TRANSACTION TERM | | | | | |
| TRANSACTION TYPE | | "20" | "34" | "51" | "53" |
| SLIP no | | SLIP NO | SLIP NO | SLIP NO | SLIP NO |
| LINE no | | LINE NO. | LINE NO. | LINE NO. | LINE NO. |
| TRANSACTION DATE | | ISSUING DATE | ISSUING DATE | ISSUING DATE | LENDING DATE |
| CUSTOM COMPANY cd | COMPANY tb | PLACE | PLACE | PLACE | PLACE |
| PERSON IN CHARGE no | EMPLOYEE tb | PERSON IN CHARGE NO. | PERSON IN CHARGE NO. | PERSON IN CHARGE NO. | PERSON IN CHARGE NO. |
| NAME OF PERSON IN CHARGE | | NAME OF PERSON IN CHARGE | NAME OF PERSON IN CHARGE | NAME OF PERSON IN CHARGE | NAME OF PERSON IN CHARGE |
| CUSTOMER cd | COSTOMER tb | CUSTOM CODE | SUPPLIER CODE | | BORROWER CODE |
| CUSTOMER/SUPPLIER COMPANY cd | COMPANY tb | | | PLACE OF REVEIVER PRIDUCT CODE | |
| PRODUCT PART cd | PRODUCT tb | PRODUCT CODE | PRODUCT CODE | PRODUCT CODE | PRODUCT CODE |
| PRODUCT STATUS SECTION | | STATUS | STATUS | STATUS | STATUS |
| PRODUCT PART NAME | | PRODUCT NAME | PRODUCT NAME | PRODUCT NAME | PRODUCT NAME |
| PRODUCT STANDARD NAME | | PRODUCT STANDARD NAME | PRODUCT STANDARD NAME | PRODUCT STANDARD NAME | PRODUCT STANDARD NAME |
| TRANSACTION SECTION | | SALES SECTION | PURCHASE SECTION | MOVING SECTION | LENDING SECTION |
| TRANSACTION QUANTITY | | QUANTITY | QUANTITY | QUANTITY | QUANTITY |
| TRANSACTION UNIT COST | | COST | COST | | |
| TRANSACTION AMOUNT | | AMOUNT | AMOUNT | | |
| WAREHOUSE | WAREHOUSE tb | SHIPPING WAREHOUSE | RECEIVING WAREHOUSE | RECEIVING WAREHOUSE | SHIPPING WAREHOUSE |
| CUSTOMER/SUPPLIER WAREHOUSE cd | WAREHOUSE tb | | | SHIPPING WAREHOUSE | |
| EXPLANATION | | EXPLANATION | EXPLANATION | EXPLANATION | EXPLANATION |
| REGISTRATION DATE | | | | | |
| CUSTOMER COMPANY NAME | | | | | |
| PRODUCT CLASSIFICATION | | | | | |
| PRODUCT MATERIALS COST | | | | | |
| PRODUCT OUTSIDE PROCESSING COST | | | | | |
| PRODUCT PREDICTED COST | | | | | |

FIG.12
FILE ID TABLE (OPERATING SCHEDULE)

| INPUT LEDGER NAME | | | | LEDGER NAME | |
|---|---|---|---|---|---|
| SALES SLIP | PURCHASE SLIP | MOVE-BETWEEN WAREHOUSE SLIP | LENDING SLIP | OPERATING SHEDULE | |
| SLIP ITEM | SLIP ITEM | SLIP ITEM | SLIP ITEM | ITEM NAME | TABLE NAME |
| | | | | TRANSACTION TERM | |
| "20" | "34" | "51" | "53" | TRANSACTION TYPE | |
| SLIP NO | SLIP NO | SLIP NO | SLIP NO | SLIP no | |
| LINE NO. | LINE NO. | LINE NO. | LINE NO. | LINE no | |
| ISSUING DATE | ISSUING DATE | ISSUING DATE | LENDING DATE | TRANSACTION DATE | |
| PLACE | PLACE | PLACE | PLACE | CUSTOM COMPANY cd | COMPANY tb |
| PERSON IN CHARGE NO. | PERSON IN CHARGE NO. | PERSON IN CHARGE NO. | PERSON IN CHARGE NO. | PERSON IN CHARGE no | EMPLOYEE tb |
| NAME OF PERSON IN CHARGE | NAME OF PERSON IN CHARGE | NAME OF PERSON IN CHARGE | NAME OF PERSON IN CHARGE | NAME OF PERSON IN CHARGE | |
| CUSTOM CODE | SUPPLIER CODE | | BORROWER CODE | CUSTOMER cd | COSTOMER tb |
| | | PLACE OF REVEIVER PRIDUCT CODE | | CUSTOMER/SUPPLIER COMPANY cd | COMPANY tb |
| PRODUCT CODE | PRODUCT CODE | PRODUCT CODE | PRODUCT CODE | PRODUCT PART cd | PRODUCT tb |
| STATUS | STATUS | STATUS | STATUS | PRODUCT STATUS SECTION | |
| PRODUCT NAME | PRODUCT NAME | PRODUCT NAME | PRODUCT NAME | PRODUCT PART NAME | |
| PRODUCT STANDARD NAME | PRODUCT STANDARD NAME | PRODUCT STANDARD NAME | PRODUCT STANDARD NAME | PRODUCT STANDARD NAME | |
| SALES SECTION | PURCHASE SECTION | MOVING SECTION | LENDING SECTION | TRANSACTION SECTION | |
| QUANTITY | QUANTITY | QUANTITY | QUANTITY | TRANSACTION QUANTITY | |
| COST | COST | | | TRANSACTION UNIT COST | |
| AMOUNT | AMOUNT | | | TRANSACTION AMOUNT | |
| SHIPPING WAREHOUSE | RECEIVING WAREHOUSE | RECEIVING WAREHOUSE | SHIPPING WAREHOUSE | WAREHOUSE | WAREHOUSE tb |
| | | SHIPPING WAREHOUSE | | CUSTOMER/SUPPLIER WAREHOUSE cd | WAREHOUSE tb |
| EXPLANATION | EXPLANATION | EXPLANATION | EXPLANATION | EXPLANATION | |
| | | | | REGISTRATION DATE | |
| | | | | CUSTOMER COMPANY NAME | |
| | | | | PRODUCT CLASSIFICATION | |
| | | | | PRODUCT MATERIALS COST | |
| | | | | PRODUCT OUTSIDE PROCESSING COST | |
| | | | | PRODUCT PREDICTED COST | |

FIG.13
FILE ID TABLE (OPERATING SCHEDULE)

| Ledger | | Sequential No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|---|
| LEDGER NAME: OPERATING SCHEDULE | | ITEM NAME | TRANSACTION TERM | TRANSACTION TYPE | SLIP NO. | LINE NO. | TRANSACTION DATE | CUSTOM COMPANY | PERSON IN CHARGE no | NAME OF PERSON IN CHARGE | CUSTOMER | CUSTOMER/SUPPLIER COMPANY | PRODUCT PART | PRODUCT STATUS SECTION | PRODUCT PART NAME | PRODUCT STANDARD NAME | TRANSACTION SECTION | TRANSACTION QUANTITY | TRANSACTION UNIT PRICE | TRANSACTION AMOUNT | WAREHOUSE | CUSTOMER/SUPPLIER WAREHOUSE | EXPLANATION | REGISTRATION DATE |
| | | TABLE NAME | | | | | | COMPANY tb | EMPLOYEE tb | | COSTOMER tb | COMPANY tb | PRODUCT tb | | | | | | | | | | | |
| INPUT LEDGER NAME | SALES SLIP | SLIP ITEM | | "20" | SLIP NO | LINE NO. | ISSUING DATE | PLACE | PERSON IN CHARGE NO. | NAME OF PERSON IN CHARGE | CUSTOMER CODE | | PRODUCT CODE | STATUS | PRODUCT NAME | PRODUCT STANDARD NAME | SALES SECTION | QUANTITY | COST | AMOUNT | SHIPPING WAREHOUSE | | EXPLANATION | |
| | PURCHASE SLIP | SLIP ITEM | | "34" | SLIP NO | LINE NO. | ISSUING DATE | PLACE | PERSON IN CHARGE NO. | NAME OF PERSON IN CHARGE | SUPPLIER CODE | | PRODUCT CODE | STATUS | PRODUCT NAME | PRODUCT STANDARD NAME | PURCHASE SECTION | QUANTITY | COST | AMOUNT | RECEIVING WAREHOUSE | | EXPLANATION | |
| | MOVE-BETWEEN-WAREHOUSE SLIP | SLIP ITEM | | "51" | SLIP NO | LINE NO. | ISSUING DATE | PLACE | PERSON IN CHARGE NO. | NAME OF PERSON IN CHARGE | PLACE OF RECEIVER | | PRODUCT CODE | STATUS | PRODUCT NAME | PRODUCT STANDARD NAME | MOVING SECTION | QUANTITY | | | RECEIVING WAREHOUSE | SHIPPING WAREHOUSE | EXPLANATION | |
| | LENDING SLIP | SLIP ITEM | | "53" | SLIP NO | LINE NO. | LENDING DATE | PLACE | PERSON IN CHARGE NO. | NAME OF PERSON IN CHARGE | LENDING CODE | | PRODUCT CODE | STATUS | PRODUCT NAME | PRODUCT STANDARD NAME | LENDING SECTION | QUANTITY | | | SHIPPING WAREHOUSE | | EXPLANATION | |

FIG.14A
FILE ID TABLE (OPERATING SCHEDULE)

| LEDGER | | INPUT LEDGER: SALES SHIP | | | | | | | | | | | | | | | | | |
|---|---|---|---|---|---|---|---|---|---|---|---|---|---|---|---|---|---|---|---|
| NAME | ITEM NAME → | "20" | SLIP NO | LINE NO. | ISSUING DATE | PLACE | PERSON IN CHARGE NO. | NAME OF PERSON IN CHARGE | CUSTOMER CODE | TRANSACTION CODE | STATUS | PRODUCT NAME | PRODUCT STANDARD NAME | SALES SECTION | QUANTITY | UNIT PRICE | AMOUNT | SHIPPING WAREHOUSE | EXPLANATION |
| OPERATING SCHEDULE | TRANSACTION TERM | | | | | | | | | | | | | | | | | | |
| | TRANSACTION TYPE | o | | | | | | | | | | | | | | | | | |
| | SLIP NO. (no) | | o | | | | | | | | | | | | | | | | |
| | LINE NO. (no) | | | o | | | | | | | | | | | | | | | |
| | TRANSACTION DATE | | | | o | | | | | | | | | | | | | | |
| | CUSTOM COMPANY (cd) | | | | | o | | | | | | | | | | | | | |
| | PERSON IN CHARGE (no) | | | | | | o | | | | | | | | | | | | |
| | NAME OF PERSON IN CHARGE | | | | | | | o | | | | | | | | | | | |
| | CUSTOMER (cd) | | | | | | | | o | | | | | | | | | | |
| | CUSTOMER/SUPPLIER COMPANY (cd) | | | | | | | | | | | | | | | | | | |
| | PRODUCT PART (cd) | | | | | | | | | o | | | | | | | | | |
| | PRODUCT STATUS SECTION | | | | | | | | | | o | | | | | | | | |
| | PRODUCT PART NAME | | | | | | | | | | | o | | | | | | | |
| | PRODUCT STANDARD NAME | | | | | | | | | | | | o | | | | | | |
| | TRANSACTION | | | | | | | | | | | | | o | | | | | |
| | TRANSACTION QUANTITY | | | | | | | | | | | | | | o | | | | |
| | TRANSACTION UNIT PRICE | | | | | | | | | | | | | | | o | | | |
| | TRANSACTION AMOUNT | | | | | | | | | | | | | | | | o | | |
| | WAREHOUSE (cd) | | | | | | | | | | | | | | | | | o | |
| | CUSTOMER/SUPPLIER WAREHOUSE (cd) | | | | | | | | | | | | | | | | | | |
| | EXPLANATION | | | | | | | | | | | | | | | | | | o |
| | REGISTRATION DATE | | | | | | | | | | | | | | | | | | |

FIG.14C

DATA PROCESSING APPARATUS

BACKGROUND OF THE INVENTION

1. Field of the Invention

The present invention relates to a data processing apparatus such as an office computer, a personal computer or the like, which processes data based on various office work files.

2. Description of the Related Art

Data processing apparatuses such as office computers and the like store and manage multifarious files such as an operating file, an accounting file, a transfer file and a personnel file. The record structures of the individual data files differ file by file. Data files are grouped into separate files, record format by record format (records having matched constituting items), and are stored and managed in such form.

The renewal of the records of an operating file, i.e., the collection of records, the addition of records or the like, is carried out by entering a sales slip, a purchase slip and the like. This renewal processing can be performed on a predetermined file in accordance with entry programs for individual slips, designed previously by experts such as system engineers.

According to conventional techniques, it is necessary to design a separate processing program for the entry processing of each slip and each file processing in accordance with the business operations of an end user. However, the actual operations change with the passage of time, so that the processing programs may not match with the actual processes and often cannot execute file processing that matches with a current mode of business operations.

In such a case, conventionally, the associated processing program should be modified partially. This modification demands very professional skills and the knowledge of programming or the like, so that it takes system engineers to do the modification. The same is true of the case where a new processing program is to be designed.

While ordinary persons in charge or end users know typical slip names and slip items used in their own working systems or the like, they cannot accurately grasp what data files are currently stored and managed, how the records of each data file are structured, and what items are included in the records of which file.

To manage sales data, personnel, etc., persons in charge understand from everyday operations that for each job management, the management of sales data requires information (items) such as product names, product numbers, amounts, quantities and unit prices, and that personnel management requires items such as the names of employees, employee numbers, ages and families. In other words, those persons in charge sufficiently grasp what should be managed as a file and what items are necessary as management items for each management target, and systematic and methodical job management is generally executed based on such knowledge.

SUMMARY OF THE INVENTION

According to the first aspect of this invention, the following can be achieved.

Assume that the records of an operating schedule file are renewed based on, for example, a sales slip and a purchase slip. When a correlation table indicative of the correlation among an operating schedule file, a sales slip and a purchase slip is input through input means, this correlation table is registered in memory means.

When each slip data is input under this situation, this slip data is entered as a slip file. Then, generating means generates a record in which item data of individual records that constitute the slip file are arranged in the arranging order of slip item names defined in the correlation table, and renewing means renews the records of the operating schedule file based on the generated record.

Therefore, a person in charge who understands the contents of various kinds of slips that are used daily and the items of a file to be managed can execute file processing as designed if the correlation table between the slips and data files is designed to match the contents of the works of that person.

The second aspect of this invention can achieve the following.

Assume that the records of an account schedule file are renewed based on, for example, an operating schedule file to be processed and a transfer schedule file. When a correlation table indicating the correlation between each file to be processed and an account schedule file is input through input means, this correlation table is registered in memory means.

Under this situation, generating means generates a record in which item data of individual records that constitute the file to be processed are arranged in the arranging order of the item names of the file to be processed, and renewing means renews the records of the account schedule file based on the generated record.

Therefore, a person in charge who understands the items of a file to be managed can execute file processing as designed if the correlation table among various data files is designed to match the contents of the works of that person.

The third aspect of this invention can achieve the following.

Suppose that a file ID (Identification) table in a predetermined form is displayed on the display screen of the data processing apparatus. Under this situation, a person in charge who understands the contents of various slips and what items are needed as a data file can clearly describe the contents of the works of that person and can accurately grasp the contents of the processing by entering the file name of a data file and individual item names of the associated record in the associated columns in the file ID table and by entering the slip name and the item names of that slip in the associated columns in that file ID table.

The fourth aspect of this invention can achieve the following.

Suppose that a file ID table is displayed on the display screen of the data processing apparatus. Under this situation, a person in charge who understands the items of a file to be managed in the data processing apparatus or the like can clearly describe the contents of the works of that person and can accurately grasp the contents of the processing by entering the file name of a data file and individual item names of a record in the associated columns in the file ID table at the time of renewing that data file and that record.

According to those aspects of this invention, a person in charge of an ordinary skill can execute file processing as intended in accordance with the contents of a predetermined correlation table, which is prepared by that person by simply describing the correlation between slips and data files or the correlation among various data files, without asking a system engineer or the like who has expert knowledge on programming or the like to design a program for processing data files.

At the time a person in charge of an ordinary skill designs file processing that matches with the works of that person, the person can clearly describe the contents of the works of that person and can accurately grasp the contents of the processing by describing the correlation between slips and data files or the correlation among various data files.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 2A illustrates the relationship between FIGS. 2B and 2C;

FIGS. 2B and 2C respectively illustrate a ledger registration slip 3-1 associated and the transfer schedule file 3;

FIG. 3A illustrates the relationship between FIGS. 3B and 3C;

FIGS. 3B and 3C respectively illustrate a ledger registration slip 4-1 associated and the operating schedule file 4;

FIG. 4A illustrates the relationship between FIGS. 4B and 4C;

FIGS. 4B and 4C respectively illustrate a ledger registration slip 5-1 and the associated account schedule file 5;

FIG. 5 is a diagram showing a journal set in a journal processor 15;

FIG. 9A illustrates the relationship between FIGS. 9B and 9C;

FIGS. 9B and 9C respectively illustrate the form of a ledger registration slip;

FIG. 10A illustrates the relationship between FIGS. 10B and 10C;

FIGS. 10B and 10C respectively illustrate the output of a file ID table;

FIG. 11 is a diagram showing a modification of the output of a file ID table;

FIG. 12 is a diagram showing another modification of the output of a file ID table;

FIG. 13 is a diagram showing a different modification of the output of a file ID table; and FIG. 14A illustrates the relationship between FIGS. 14B and 14C;

FIGS. 14B and 14C respectively illustrate a further modification of the output of a file ID table.

DETAILED DESCRIPTION OF THE PREFERRED EMBODIMENT

One preferred embodiment of the present invention will now be described with reference to FIGS. 1 through 10.

Figure 1:
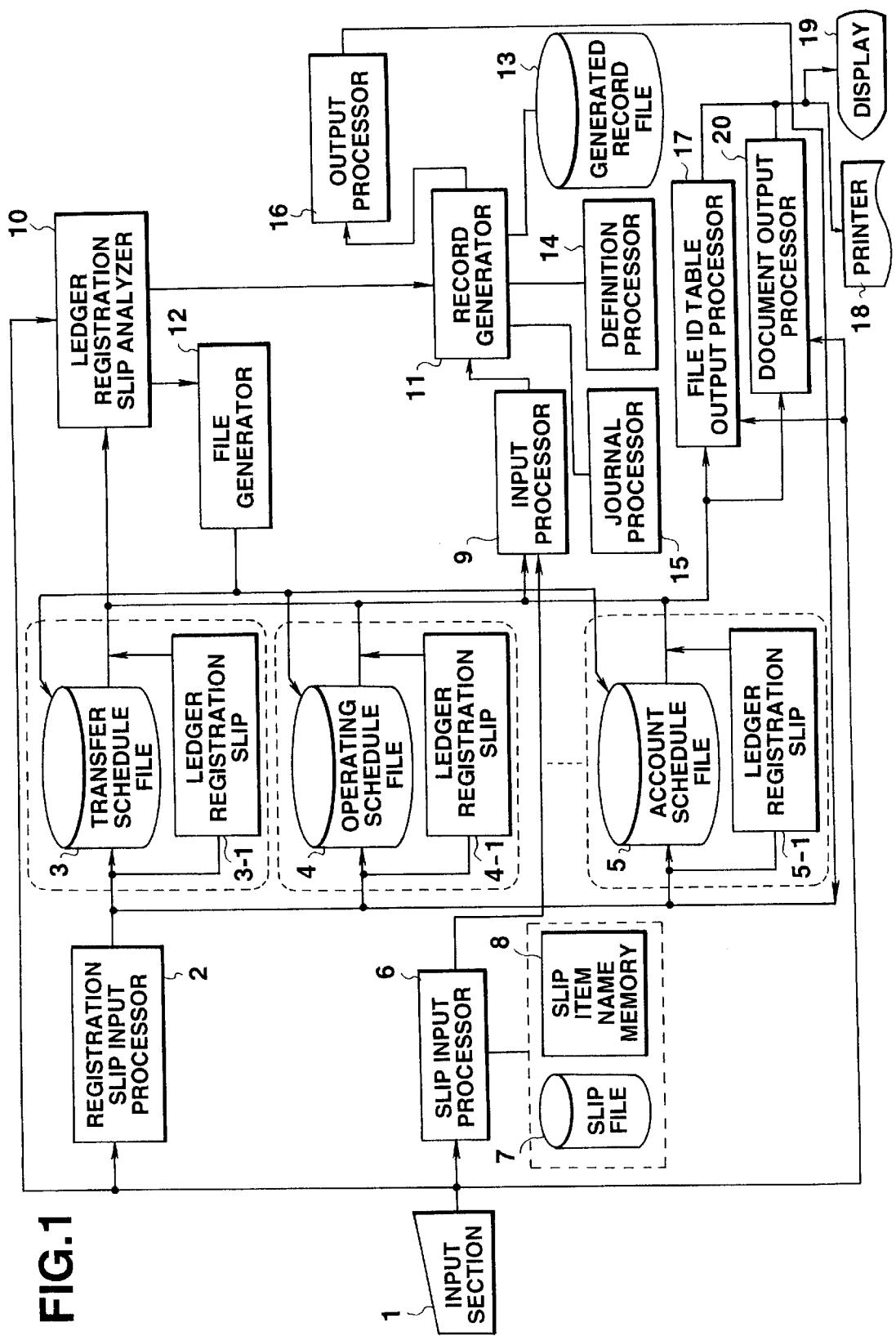
FIG. 1 is a block diagram showing the general structure of a data processing apparatus.

FIG. 1 presents a block diagram showing the general structure of a data processing apparatus.

An input section 1 has a key input unit for entering various kinds of data and commands, etc. and a mouse or the like as a pointing device. When the input of a ledger registration slip is instructed through this input section 1, a registration slip input processor 2 is invoked by this instruction to execute the process of inputting a ledger registration slip entered through the input section 1.

Figures 3A, 3B, 3C:
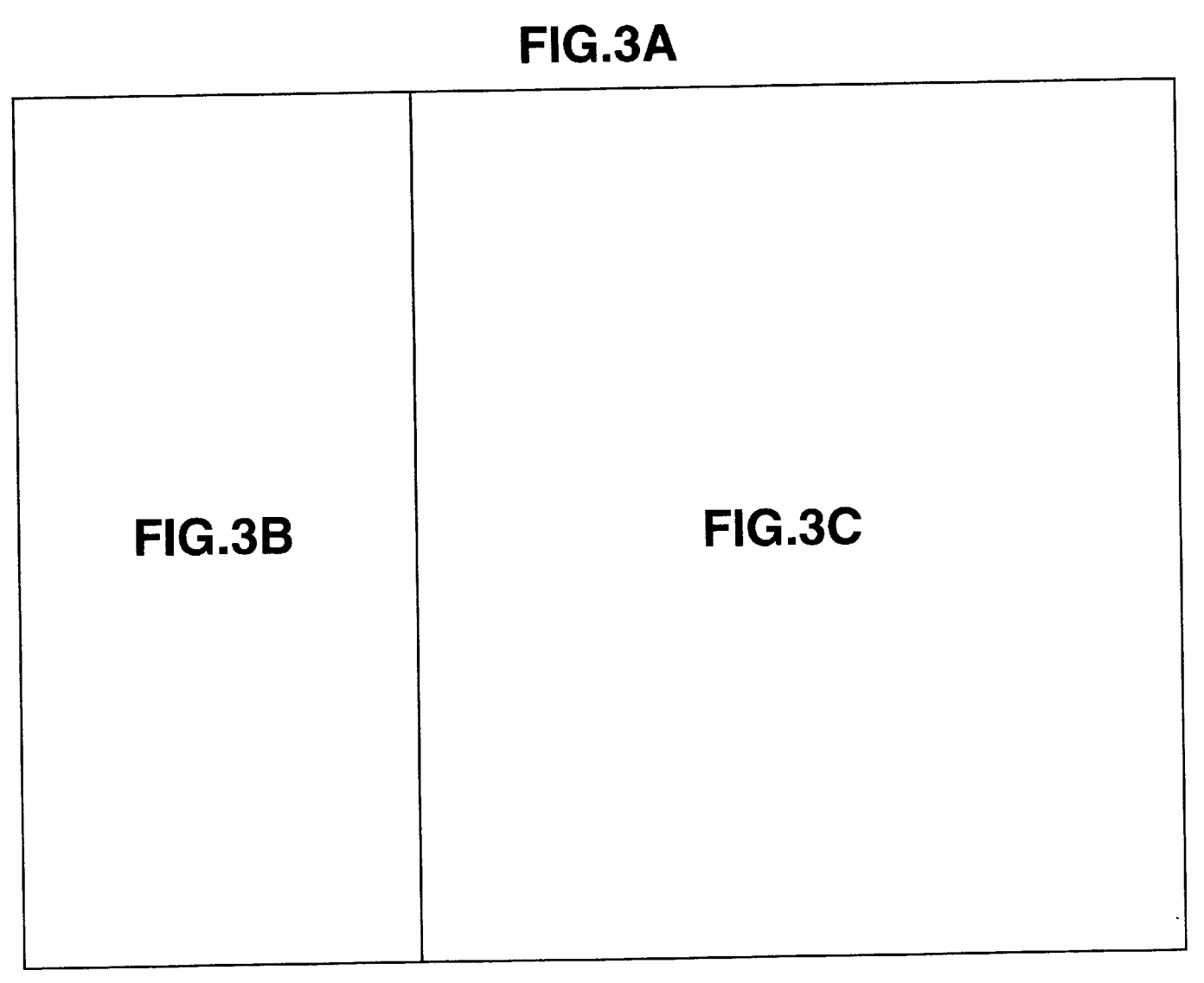

The ledger registration slip will now be described. FIGS. 2A through 4C illustrate specific examples of an ledger registration slip. FIGS. 2B and 2C illustrate a ledger registration slip associated with a transfer schedule file, FIGS. 3B and 3C illustrate a ledger registration slip associated with an operating schedule file, and FIGS. 3B and 3C illustrate a ledger registration slip associated with an account schedule file. In other words, ledger registration slips 3-1, 4-1 and 5-1 are stored and managed in association with a transfer schedule file 3, an operating schedule file 4 and an account schedule file 5 and the forms of the individual registration slips basically have the same structure in this embodiment.

The basic structure of the ledger registration slips 3-1 and 4-1 shown in FIGS. 2A through 3C takes the form of the correlation table which associates the individual item names of each record in a data file with the individual item names of one or two or more slips to be processed at the time of renewing records of that data file. The basic structure of the ledger registration slip 5-1 shown in FIGS. 4A through 4C takes the form of the correlation table which associates the individual item names of each record in a data file with the individual item names of one or two or more files to be processes at the time of renewing records of that data file.

Figures 9A, 9B, 9C:
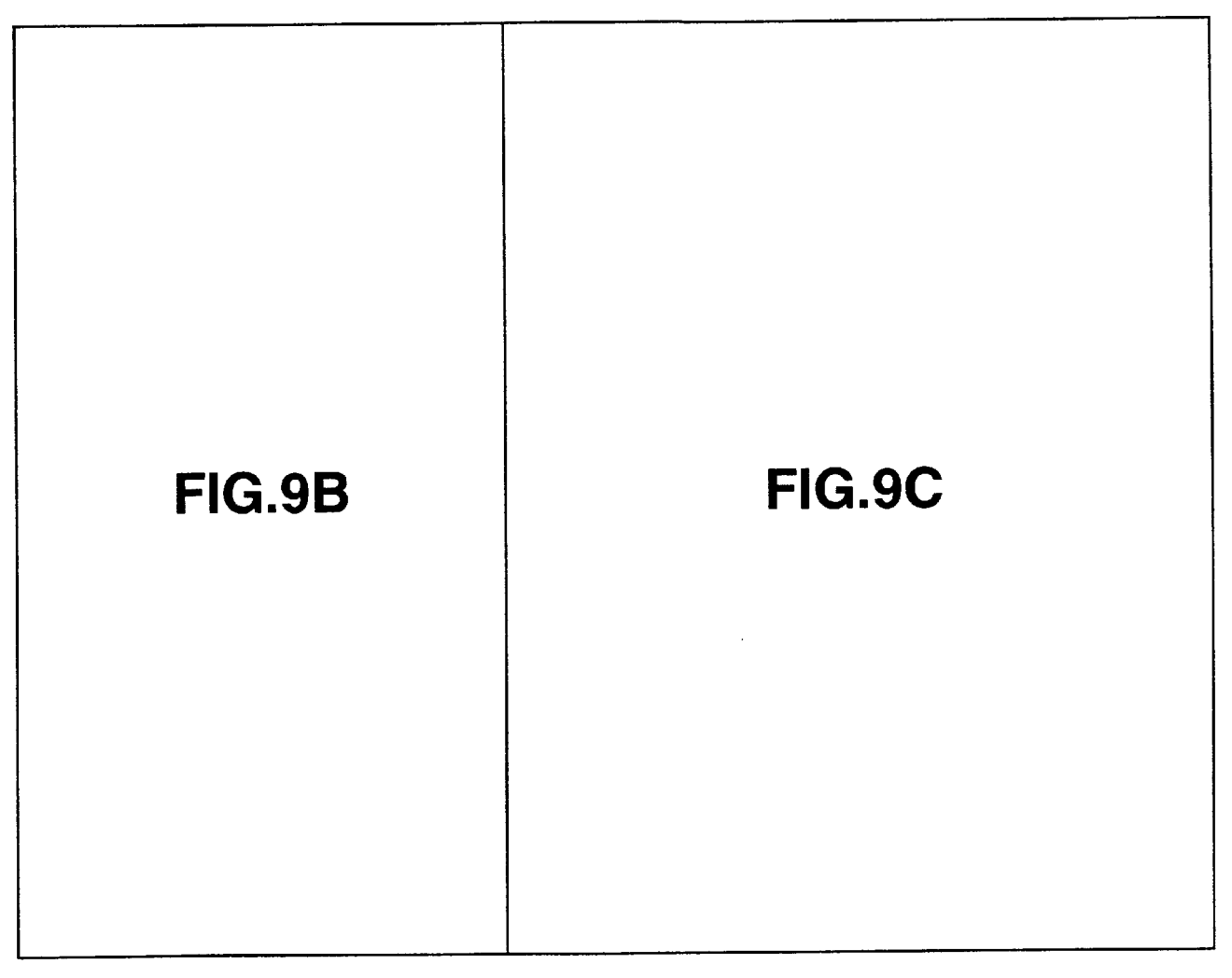

First, in FIGS. 2B and 2C, the alphabet letters A, B, C and so forth written outside the top line of the frame of the ledger registration slip 3-1 in the horizontal direction indicate the column positions of the registration slip designed in a matrix form, and the numerals 1, 2, 3 and so forth written in the vertical direction indicate the line positions. The lines constituting the table frame and cell frames and the individual captions (e.g., ledger name, item name, attribute, input ledger name, job name, etc.) are included in the slip form previously set in the registration slip input processor 2. With this form displayed on the display screen, data is sequentially input while designating arbitrary item positions from the input section 1. FIGS. 9B and 9C illustrate the specific contents of this slip form.

This input process will be described below more specifically. The file name "transfer schedule" of the transfer schedule file 3 is entered in association with the title "ledger name" in the slip form, and the individual item names (transaction term, slip type, slip no. transaction date, issuing company cd, etc.) are entered one after another in association with the record structure of the transfer schedule file 3. In the diagram, "cd" indicates a code, and "slip no" indicates the sequential slip number. Predetermined entries are made one after another in the cells "attribute," "number of digits," "table name" and "definition" in association with the individual item names. The "attribute" indicates the attribute of an associated item; for example, "R" defines the flush to the right and "N" defines a numeral. The "number of digits" indicates the number of digits of an associated item. The "table name" indicates the name of an index table which should be referred to at the time of generating data of an associated item; for example, the "debit bank cd" indicates that code/character conversion is to be performed by referring to the index table indicated by the associated table name "bank td" to thereby generate the associated item data. The "definition" indicates the generation condition for generating data of an associated data by referring to the index table or the like as needed. For example, the definition "#current day" corresponding to the "registration date" indicates that the current date on which the file has been registered should be made the registration date.

The contents of the "attribute," "number of digits," "table name" and "definition" are referred to when the transfer schedule file 3 is output as a document, and the "definition" is also referred to at the time of generating slip items to be described later.

In association with the "input ledger name" in the ledger registration slip 3-1 shown in FIG. 2C, the slip names "transfer slip" and "travel expense report" of various kinds of slips are input. This slip is the processing target at the time of renewing the records of the transfer schedule file 3. When there are multiple slips having the same slip name, the lower conceptual slip name is entered slip by slip in association with the title "job name" in order to distinguish those slips from one another. That is, the "job name" is the cell to define the lower conceptual slip name and the same name as the "input ledger name" may be entered in this cell.

The "function name" defines if a slip or a file to be processed needs special processing (journal processing which will be discussed later). When the processing target is a slip, "slip" is entered in the cell "function name," and when the processing target needs special processing, "journal" is entered in the cell "function name." The "renewal type" indicates the type of renewal at the time of renewing the records of the transfer schedule file 3. For example, an arbitrary renewal type selected from among the collection of records, the addition of records, the addition and collection of records, etc. is entered slip by slip. In the illustrated example, "add" which defines the addition of records is entered as the renewal type for the "transfer slip" and "travel expense report."

The individual slip item names constituting a slip are entered item by item in association with the record item names in a data file. More specifically, the individual item names of the transfer slip, "#division (date, 1, 6), "62," slip no, date, issuing company, . . ." are input in association with the record item names of the transfer schedule file 3. Likewise, for the slip of the travel expense report, its item names, "#division (date, 1, 6), "63," slip no, expense reporting date, belonging company, . . ." are entered in association with the record item names of the transfer schedule file 3.

The slip item name "#division (date, 1, 6)" indicates that of the 8-digit date data, the data of the year and month from the most significant digit to the sixth digit should be separately extracted. The slip item names "62," "63" and the like indicate fixed values (slip type). The title "slip item" should be input to the cell on the seventh line in the G column in the ledger registration slip 3-1 and on the seventh line in the H column to indicate that data input in the individual lines in those columns are slip item names.

When a cell in the column of the slip item name is blank and a record generating condition is described in the cell "definition" at the associated item position, i.e., when the item exists as a record item of a data file, not as a slip item, and the item data should particularly be generated, this combination indicates that the data of the slip item should be generated in accordance with the contents of the "definition."

The items following the line item position "30" in the ledger registration slip 3-1 are those needed at the time of outputting the contents of the transfer schedule file 3 as a document, and are separated from the record structure of the transfer schedule file 3 at the horizontal double line in the diagram, and necessary information should be input in the cells "item name," "attribute," "table name" and "definition." The description "#index (issuing company cd, company name)" in the cell "definition" indicates that the issuing company table should be searched by the item name "issuing company code" defined as "12" at the line item position in the ledger registration slip 3-1 to read the company name from this table and to generate the issuing company.

The cell "renewal date" for the associated "ledger name" indicates the latest renewal date at the time of renewing the codes of its data file, and the cell "number of records" indicates the total number of renewed records which is incremented every time the renewal processing is performed. The "renewal date" and "number of entries" provided for each slip in association with the "input ledger name" are the renewal date and the number of entries, set in each slip file, which are read out and posted in the ledger registration slip 3-1. That is, the titles of the individual cells and the contents thereof are not what has been entered by the user, but are automatically added.

The ledger registration slip 4-1 in the operating schedule file 4, like the ledger registration slip 3-1, associates the record item names in a data file with the item names in various kinds of slips as shown in FIGS. 3B and 3C. In this case, the ledger registration slip 4-1 indicates that the operating schedule file 4 is the target data file, and "sales slip," "purchase slip," "move-between-warehouse slip" and "lending slip" are the target slips, and defines that the records of the operating schedule file 4 should be renewed based on those four types of slips.

The ledger registration slip 5-1 in the account schedule file 5 associates the record item names in one data file with those in other data files, as shown in FIGS. 4B and 4C. In the illustrated example, the transfer schedule file 3 and the operating schedule file 4 are the data files to be processed at the time of renewing the records of the account schedule file 5. In this case, the record item names in the transfer schedule file are associated with the record item names in the operating schedule file 4 in association with the record item names in the account schedule file 5, and the item names of records in the transfer schedule file 3 and the operating schedule file 4 are entered for each of the record on the "debit" side and the record on the "credit" side.

In this example, "journal" is defined as the "function name" of the operating schedule file 4 in the ledger registration slip. This journal indicates that with regard to the items marked with "$" like "$debit account" as the slit item name defined in the ledger registration slip or the items marked with "@" like "@amount", item data should be generated by referring to the journal table shown in FIG. 5.

When slip data such as a transfer file or travel expense report is input from the input section 1, a slip input processor 6 receives and processes this data to produce a slip file 7. A slip item name memory 8 stores the slip item names in the arranging order in addition to the name of this slip file 7 in association with various types of slips in the slip file 7. The slip input processor 6 supplies the slip file 7 and the slip item names associated with the slip to an input processor 9.

At the time the records of a data file are renewed, a ledger registration slip analyzer 10 receives the ledger registration slip associated with the data file designated as the renewal target and analyzes the definitions. The results of the analysis are given to a record generator 11. At this time, when no data file defined in the ledger registration slip is present in the system, the ledger registration slip analyzer 10 activates a file generator 12 under such a condition. This file generator 12 newly generates a data file with the record structure in which the item names are arranged based on the file name of the data file defined in the ledger registration slip and the record item names, and sets that data file in association with the ledger registration slip.

At the time of renewing records in the slip file 7, transfer schedule file 3, operating schedule file 4, account schedule file 5 or the like received via the input processor 9, the record generator 11 generates records in accordance with the results of the analysis from the analyzer 10, and stores the records in a generated record file 13. When the processing target is a slip at the time of renewing the records of the data file, the record generator 11 generates records with item data sorted in the arranging order of the slip item names defined in the ledger registration slip. At the time of sorting the record items, the record generator 11 refers to the contents of the slip item name memory 8, checks the item positions of the slip item names defined in the ledger registration slip, extracts the item data and sorts the item data accordingly. When the processing target is a file such as the transfer schedule file 3 or the operating schedule file 4, the record generator 11 extracts the data of the record items of the target file for processing, defined in the ledger registration slip, generates records obtained by sorting the item data of individual records constituting the processing target file like the transfer schedule file 3 or the operating schedule file 4, in the arranging order of the item names, and stores the records in the generated record file 13.

When the description in the "definition" column in the ledger registration slip, like "#index (customer tb, customer cd, customer name)" at the fifth line in the E column in FIG. 4C, indicates that the item data should be produced by referring to an index table, a definition processor 14 produces item data by referring to the associated index table among various index tables previously set in the processor 14, and sets the item data at the associated item positions in the generated record file 13. When "#slip sequential number" and "#the day" are described in the "definition" column in the ledger registration slip, the definition processor 14 sets the slip sequential number and date information at the associated item positions in the generated record file 13.

When "journal" is defined in the "function name" column in the ledger registration slip, a journal processor 15 produces data of the necessary items by referring to the journal table previously set in the processor 15, and sets the data at the associated positions in the generated record file 13. FIG. 5 exemplifies sales slip journal table. When the input ledger name is "operating schedule" as in the ledger registration slip 5-1 shown in FIG. 4C, the processor 15 refers to the sales slip journal table shown in FIG. 5 at the time of generating item data with "$" and "@" affixed to the record item names on the debit and credit sides. In this case, when the values of the record items in the operating schedule file 4 associated with the individual item names set in the fourth line in the B column, the fourth line in the C column and the fourth line in the D column respectively satisfy the values set at the associated lines (the fifth line to the twelfth line), the item values set in the same line in the journal table are read from the journal table and are set at the associated item positions in the generated record file 13.

An output processor 16 receives the contents of the generated record file 13 via the record generator 11, and updates the records of a data file among a plurality of data files like the transfer schedule file 3, the operating schedule file 4 and the account schedule file 5, which is defined as "ledger name" in the ledger registration slip. At this time, the output processor 16 checks the "renewal type" defined in the ledger registration slip and renews the records of the data file in accordance with this "renewal type" to execute the record collection, the addition of records or the like. A file ID table output processor 17 reads the ledger registration slip of an arbitrarily specified data file, produces the file ID table of a predetermined format in accordance with the description contents, and outputs the table on a printer 18 or a display unit 19. According to this embodiment, while a file ID table is so produced as to have the form of the ledger registration slip and the description contents and, any output form is used as long as this form is easy to read as a list.

A document output processor 20 produces output records based on the data file arbitrarily designated as the output target and the associated ledger registration slip, and outputs the records on the printer 18 or the display unit 19. At this time, based on the "attribute," "number of digits," "table name," and "definition" in the ledger registration slip, the processor 20 refers to various tables in the definition processor 14 to output names corresponding to codes and to perform the record collection or the like as needed.

The operation of this embodiment will now be explained with reference to the flowcharts illustrated in FIGS. 6 through 8.

Figure 6:
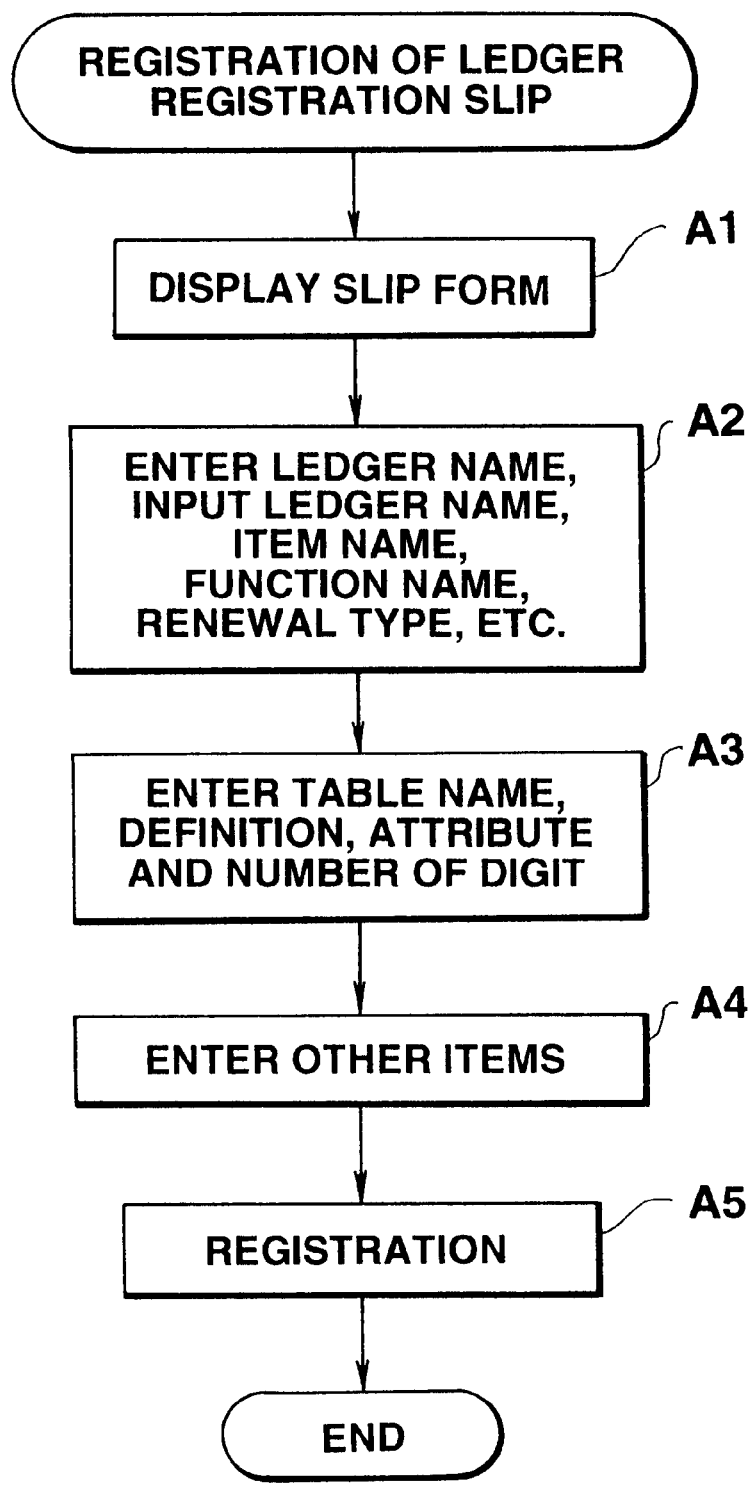
FIG. 6 is a flowchart illustrating the operation of preparing and registering a ledger registration slip.

FIG. 6 is a flowchart illustrating the operation of preparing a ledger registration slip and registering it in the data processing apparatus.

When the preparation of a ledger registration slip is instructed through the input section 1, the registration slip input processor 2 displays the pre-set form of the ledger registration slip as a file ID table (step A1). FIGS. 9B and 9C illustrate this slip form which consists of lines such as the outer frame and cell frames, titles for the individual columns such as "ledger name," "input ledger name," "item name," "attribute," and "job name," and various description columns associated with the titles. An end user sequentially enters the necessary information in each description column. In this case, the end user understands the contents of daily slips, what should be managed as a file, and what items are necessary as control items, and describes the necessary information in predetermined columns in the ledger registration slip in such a manner as to match with the works of the end user.

More specifically, the person in charge or the like first enters the name of a data file in accordance with the title "ledger name," enters the individual item names according to the record structure of this record structure of this data file, enters the names of the slips or the names of the files to be processed file name slip by slip or file by file, sequentially enters the necessary information in the description columns of the titles "job name," "function name" and "renewal type" in association with those titles, and sequentially enters the slip item names or the record item names of the file (step A2). As a result, the record item names of the transfer schedule file 3 are associated with the individual slip item names of the transfer slip and the travel expense report in the generated record file 3-1 shown in FIG. 9B and 9C illustrate.

Next, "attribute," "number of digits," "table name" and "definition" are entered in association with the individual item names of the data file defined by the "ledger name" (step A3). If an index table defined by the table name were not present in the definition processor 14 at this time, this table should have arbitrarily been prepared and should have been registered in the definition processor 14. Then, the necessary information should have been entered below the horizontal double line as shown in FIGS. 2B, 2C, 3B, 3C, 4B and 4C in association with the individual items would become necessary at the time of outputting a document (step A4).

When an arbitrary ledger registration slip is prepared in this manner and the registration thereof is then instructed, this ledger registration slip is registered in the system (step A5). In this case, the ledger registration slip is registered in association with the data file that is defined by the "ledger name" in the ledger registration slip.

Figure 7:
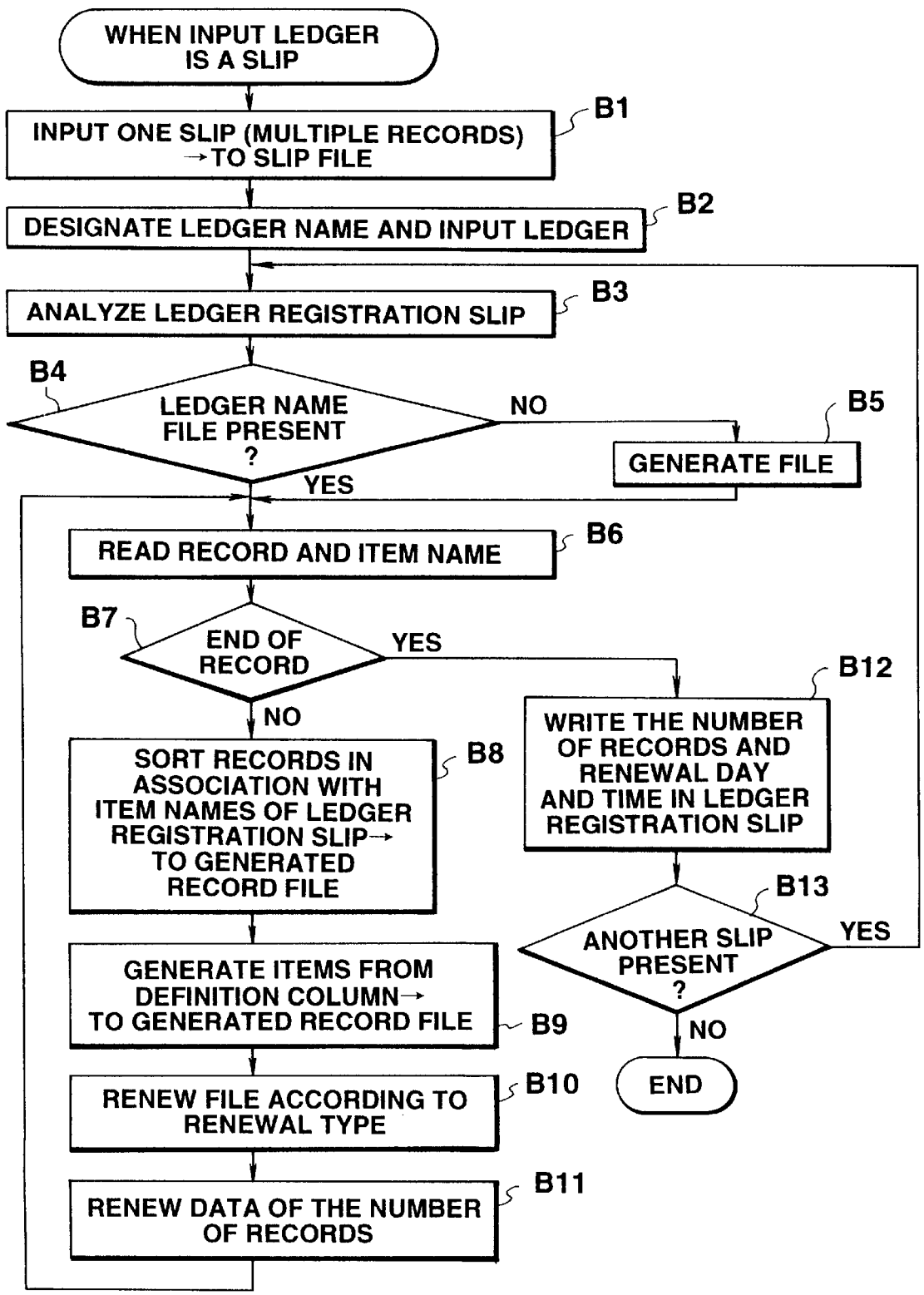
FIG. 7 is a flowchart illustrating the operation of renewing the records of a data file in accordance with the ledger registration slip when a slip is to be processed.

FIG. 7 presents a flowchart illustrating the file processing that is executed based on the ledger registration slip. The illustrated operational algorithm is for the case where the "input ledger name" in the ledger registration slip is a slip.

First, when one slip (one or multiple records) of slip data to be processed is input from the input section 1, the slip input processor 6 stores the input slip data in the slip file 7 (step B1). It is to be noted that slip names and slip item names are previously defined in the slip item name memory 8. As the slip file is prepared in this manner, the processor 6 affixes the renewal date and the number of input records in the slip file 7 in association with each other.

Next, as the "ledger name" and "input ledger name" are designated through the input section 1, the process associated with the ledger registration slip is initiated (step B2). Assuming that the transfer schedule file 3 is designated as the "ledger name" and a transfer slip and a travel expense report are designated as the "input ledger name," then the ledger registration slip analyzer 10 fetches the ledger registration slip 3-1 in the transfer schedule file 3 and analyzes it (step B3).

First, the analyzer 10 checks if the data file defined as the "ledger name" is actually present in the system based on the ledger registration slip 3-1 shown in FIGS. 2B and 2C (step B4). If the absence of the file is detected, the analyzer 10 activates the file generator 12. As a result, the file generator 12 reads the file name corresponding to the "ledger name," the item names, attributes numbers of digits from the ledger registration slip 3-1 shown in FIGS. 2B and 2C prepares a data file with the record structure consisting of items with the specified numbers of digits in the order of the item names, and registers this data file as the transfer schedule file 3 associated with the ledger registration slip 3-1 (step B5). According to this embodiment, therefore, a data file associated with the ledger registration slip is newly prepared based on this ledger registration slip. When the transfer schedule file 3 already exists, as opposed to the above case, such file preparation is not executed.

In accordance with the results of the analysis by the ledger registration slip analyzer 10, the record generator 11 reads the contents of the slip file 7 and the slip item name memory 8, which correspond to the transfer slip of the "input ledger name," defined in the third line in the G column in the ledger registration slip 3-1, as the first processing target (step B6). In this case, the reading of the slip file 7 is executed under the condition that the slip has been designated in the step B2. As the transfer slip is designated, the contents of the slip file 7 and the slip item name memory 8 for the transfer slip are read. One record of data is extracted from the top of the slip file 7, and a record with the item data of the extracted record sorted in the arranging order of the individual item names of the transfer slip defined in the ledger registration slip 3-1 is produced and set in the generated record file 13 (step B8) under the condition that the end of record has not been reached (step B7). In this case, because the contents of the transfer item name memory 8 for the transfer slip differ from the slip item names defined in the ledger registration slip 3-1 in the number of items, the arranging order and the item names, the record generator 11 performs the sorting of the item data by sequentially reading the slip item names defined in the ledger registration slip 3-1 from the top and collating the read slip item names with the contents of the slip item name memory 8 to check what item position in the extracted record each associated item data is located.

When the record generator 11 generates the record which is the first record in the transfer slip file with the item data sorted in accordance with the contents of the ledger registration slip 3-1, the definition processor 14 is activated. The definition processor 14 generates data of the necessary items by referring to the definition column (E column) in the ledger registration slip 3-1, and supplies the data to the record generator 11 to write it at the associated item position in the generated record in the generated record file 13 (step B9). The definition column provides the generating condition that defines the generation of the item data which is present in the records in the data file defined by the ledger name or which is not present in the slip items indicated by the input ledger name. The definition processor 14 generates the item data while referring to the index table as needed. In this case, the current date is read in accordance with the contents of the definition column in the 29th line in the E column in the ledger registration slip 3-1 in FIG. 2C, and is written at the associated item in the generated record as the item data of the registration date.

Next, the output processor 16 reads the generated record from the generated record file 13 and renews the records of the transfer schedule file 3 in accordance with the "renewal type" defined in the ledger registration slip 3-1. As "add" is defined as the "renewal type," the output processor 16 adds the generated record to the transfer schedule file 3 (step B10).

When the records of the transfer schedule file 3 are renewed accordingly, the renewal of the data on the number of records is executed in the work area in the record generator 11 in the next step B11. The flow then returns to step B6 to read the next one record of data from the transfer slip file after which the same processing as discussed above (steps B6 to B11) is repeated for each record.

When the processing of all the records in the transfer slip file is completed, the flow advances to step B12 where the number-of-records data and the renewal day and time (current day and time) are written in the predetermined cells in the ledger registration slip 3-1 and the renewal day and time and the number of entries, previously added to the transfer slip file, are read and written in the predetermined cells in the ledger registration slip 3-1 (see FIG. 2). It is then checked if another slip is present as the "input ledger name" in the ledger registration slip 3-1 (step B13). When there is another such slip which is designated as the processing target, the flow returns to step B3 to repeat the above-described processing for this slip. In this case, as the "travel expense report" is present as another slip in the ledger registration slip 3-1 in FIGS. 2B and 2C and this slip is designated as the processing target in step B2, the renewal of the records of the transfer schedule file 3 is executed on the basis of the transfer file of this travel expense report in the similar manner.

Although the file processing based on the ledger registration slip 3-1 in the transfer schedule file 3 has been depicted in the above-described example, file processing for the ledger registration slip 4-1 in the operating schedule file 4 is executed according to the flowchart illustrated in FIG. 7. In this case, the records of the operating schedule file 4 are renewed based on the slip files of the individual slips "sales slip," "purchase slip," "move-between-warehouse slip" "lending slip" defined by the input ledger name. When any one of those four types of slips is alone designated as the processing target, the renewal of the records of the operating schedule file 4 is performed based on the designated slip.

Figure 8:
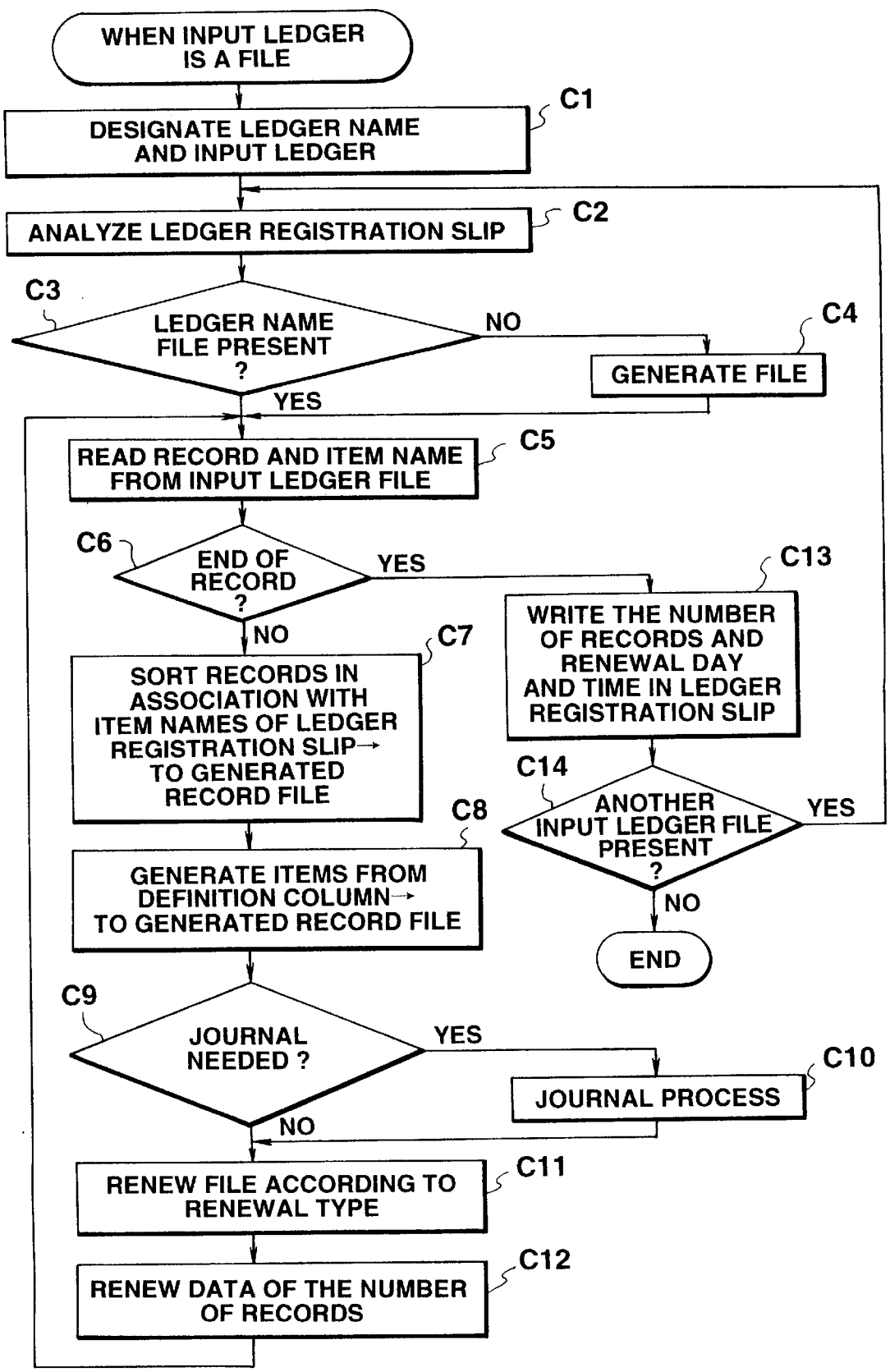
FIG. 8 is a flowchart illustrating the operation of renewing the records of a data file in accordance with the ledger registration slip when a file is to be processed.

FIG. 8, like FIG. 7, presents a flowchart illustrating the file processing that is executed based on the ledger registration slip. The illustrated operational algorithm is for the case where the "input ledger name" in the ledger registration slip is a file. The flowchart in FIG. 8 is basically the same as that in FIG. 7.

First, the "ledger name" and "input ledger name" are designated (step C1). Assume that the account schedule file 5 is designated as the "ledger name" and the transfer schedule file 3 and the operating schedule file 4 are designated as the "input ledger name." Then, the ledger registration slip analyzer 10 fetches the ledger registration slip 5-1 in the account schedule file 5 and analyzes it (step C2). When the associated file (account schedule file 5) is not present in the system, the analyzer 10 activates the file generator 12. Consequently, the file generator 12 generates the account schedule file 5 having the record structure matching with the contents of the ledger registration slip 5-1 (steps C3 and C4).

Next, with the first transfer schedule file 3 described as the "input ledger name" in the ledger registration slip 5-1 taken as the processing target, the first record and item name in this transfer schedule file 3 are read out (step C5). A record with the item data of the read record sorted in the arranging order of the individual item names of the transfer schedule file 3 defined in the ledger registration slip 5-1 is produced and set in the generated record file 13 (step C7) under the condition that the end of record has not been reached (step C6). Then, the definition processor 14 generates data of the necessary items in accordance with the descriptions in the definition column in the ledger registration slip 5-1 and sets the record in the generated record file 13 (step C8). In this case, the 25th line and the 32nd line in the E column in the ledger registration slip 5-1 define that item data should be generated by referring to an index table as shown in FIG. 4C. In accordance with the description in, for example, the 32nd line in the E column, "#index (customer tb, customer/supplier cd, customer name)," therefore, the definition processor 14 refers to the index table with the customer/supplier cd and the customer tb in the 24th line in the column A in the ledger registration slip 5-1, generates the customer name read from this index table as the item data of the transfer schedule file 3, and sets it in the generated record file 13.

Next, it is checked if "$" and "@" which need the journal process are present in the contents of the ledger registration slip 5-1 described as the item names of the transfer schedule file 3 (step C9). As no journal process is needed in this case, the flow advances to step C11 where the output processor 16 renews the records of the account schedule file 5 in accordance with the "renewal type" of the transfer schedule file 3 as defined in the ledger registration slip 5-1. Then, the number of records is incremented (step C12), and the next record is read from the transfer schedule file 3 (step C5), after which the above-described operation is repeated until the processing for all the records is completed.

When the renewal of the records of the account schedule file 5 based on all the records in the transfer schedule file 3 is completed, the number of records and the renewal day and time (current day and time) both resulting from the current file processing are written in the associated and predetermined cells in the ledger registration slip 5-1 and the renewal day and time and the number of entries, added to the transfer schedule file 3, are written in the predetermined cells in the ledger registration slip 5-1 (step C13). When it is detected in the next step C14 that another file is present in the ledger registration slip 5-1, the flow returns to step C2 to repeat the above-described processing for the next operating schedule file 4.

In this case, as the items with "$" and , "@" which indicate the necessity of the journal process are present in the items of the operating schedule file 4 in the ledger registration slip 5-1, the journal processor 15 produces item data by referring to the journal table shown in FIG. 5. When the record item values of the operating schedule file 4 are "20," "3" "70002145" in association with the individual item names set in the fourth line in the B column, the fourth line in the C column, and the fourth line in the D column in the sales slip journal table shown in FIG. 5, the item values set in the same lines in the journal table, for example, "5221" for the "$debit account" as the item name in the ledger registration slip 5-1 and "1167" for the "$credit account," are read from the journal table and set at the associated item positions in the generated record file 13. Thereafter, the same processing is performed for the other records in the operating schedule file 4.

Based on the ledger registration slip arbitrarily described by an ordinary person in charge in accordance with the works of this person, file processing is performed as described in the above-discussed manner. To confirm the descriptions in an arbitrary ledger registration slip later, this ledger registration slip should be designated and the outputting of the ledger registration slip should be instructed through the input section 1. In response to this instruction, the file ID table output processor 17 operates to read the designated ledger registration slip and outputs it as a file ID table from the printer 18 or on the display unit 19.

FIGS. 10B and 10C illustrate a file ID table which has substantially the same contents as the ledger registration slip 4-1 and is output based on the ledger registration slip 4-1 of the operating schedule file 4 in the same form as that of the ledger registration slip 4-1. That is, the correlation between the file name of the operating schedule file 4 and its individual record item names and the correlation among the slip names, "sales slip," "purchase slip," "move-between-warehouse slip" and "lending slip," and their slip item names are output as the file ID table in the same form as the form of the ledger registration slip 4-1, except that the cells of the renewal day and time and the number of records, both associated with the ledger name, and the cells of the renewal day and time and the number of entries, both associated with the input ledger name, are removed from the ledger registration slip. Anybody can easily grasp the contents of the processing by simply viewing this file ID table and can correct the processing contents by referring to this file ID table.

According to this embodiment, as described above, once an ordinary person in charge simply describes predetermined information in the ledger registration slip in such a way as to match his or her works, file processing can be executed as intended by this person in accordance with the contents of the ledger registration slip.

At the time of designing file processing which matches with the works of an ordinary person in charge, this person can clearly describe the works by displaying the form of the ledger registration slip as a file ID table and describing predetermined information in the associated cells in the ledger registration slip so that anybody can clearly grasp the contents of the processing.

The output form of the file ID table should not necessarily have a fixed form as shown in FIGS. 10B and 10C but may take the forms as shown in FIGS. 11 to 14C. FIGS. 11 to 14 show modifications of the file ID table in FIGS. 10B and 10C output based on the ledger registration slip 4-1 of the operating schedule file 4. The modifications in FIGS. 11 to 14C of the file ID table about the operating schedule, each showing the correlation between the file name of the operating schedule file 4 and its record item names and the correlation among the slip names of various slips and the slip item names, have the same basic structure as that of the file ID table in FIGS. 10B and 10C but are designed for better readability and better listing.

The file ID table shown in FIG. 11 is the file ID table in FIGS. 10B and 10C from which the "attribute," "number of digits" and "definition" columns on the side of the operating schedule file 4 are removed and the "job name," "function name" and "renewal type" columns on the slip side are removed. In this case, each cell in the "ledger name" column and each cell in the "input ledger name" column are associated with each other in the same line, and the column of the file names and the column of the slip names are associated with each other accordingly in the line direction, thereby improving the listing and readability. The "table name" column and the "item name" column (the item column below the horizontal double line in the diagram), which is needed at the time of outputting a document based on the operating schedule file 4, are elements of the file ID table shown in FIG. 11 as in the file ID table in FIGS. 10B and 10C.

The file ID table shown in FIG. 12 is basically the same as the file ID table shown in FIG. 11, with the difference lying in that the "ledger name" side and the "input ledger name" side in the file ID table in FIG. 12 are reversed. That is, the "ledger name" is positioned on the left-hand side and the "input ledger name" is positioned on the right-hand side in the file ID tables in FIGS. 10B, and 10C and 11 whereas the "ledger name" is positioned on the right-hand side and the "input ledger name" is positioned on the left-hand side in FIG. 12, and the "attribute," "number of digits" and "definition" columns and the "job name," "function name" and "renewal type" columns are removed from the elements from the file ID table as in the case of the file ID table shown in FIG. 11. While the "ledger name" side and the "input ledger name" side are separated by the horizontal double line in the file ID table in FIG. 11, they are separated by the horizontal space provided therebetween in the file ID table shown in FIG. 12. In this case, the associated item cells are connected by horizontal lines to prevent the correlation between the items from being broken by the space.

The file ID table shown in FIG. 13 is characterized by the vertical writing form, as opposed to the horizontal writing form of the file ID tables shown in FIGS. 11 and 12. The file ID table in FIG. 13 basically has the same structure as the file ID table shown in FIG. 11 except that "ledger name" is arranged on the upper side and "input ledger name" is arranged on the lower side in FIG. 13, the vertical writing form is used and some columns are eliminated. In other words, while the cells for describing the item names which become necessary at the time of outputting a document are the elements of the file ID table in FIG. 11, those description cells are removed from the file ID table in FIG. 13 with the arrangement of the other elements being directly changed to the vertical writing form from the horizontal writing form.

Figure 14C:
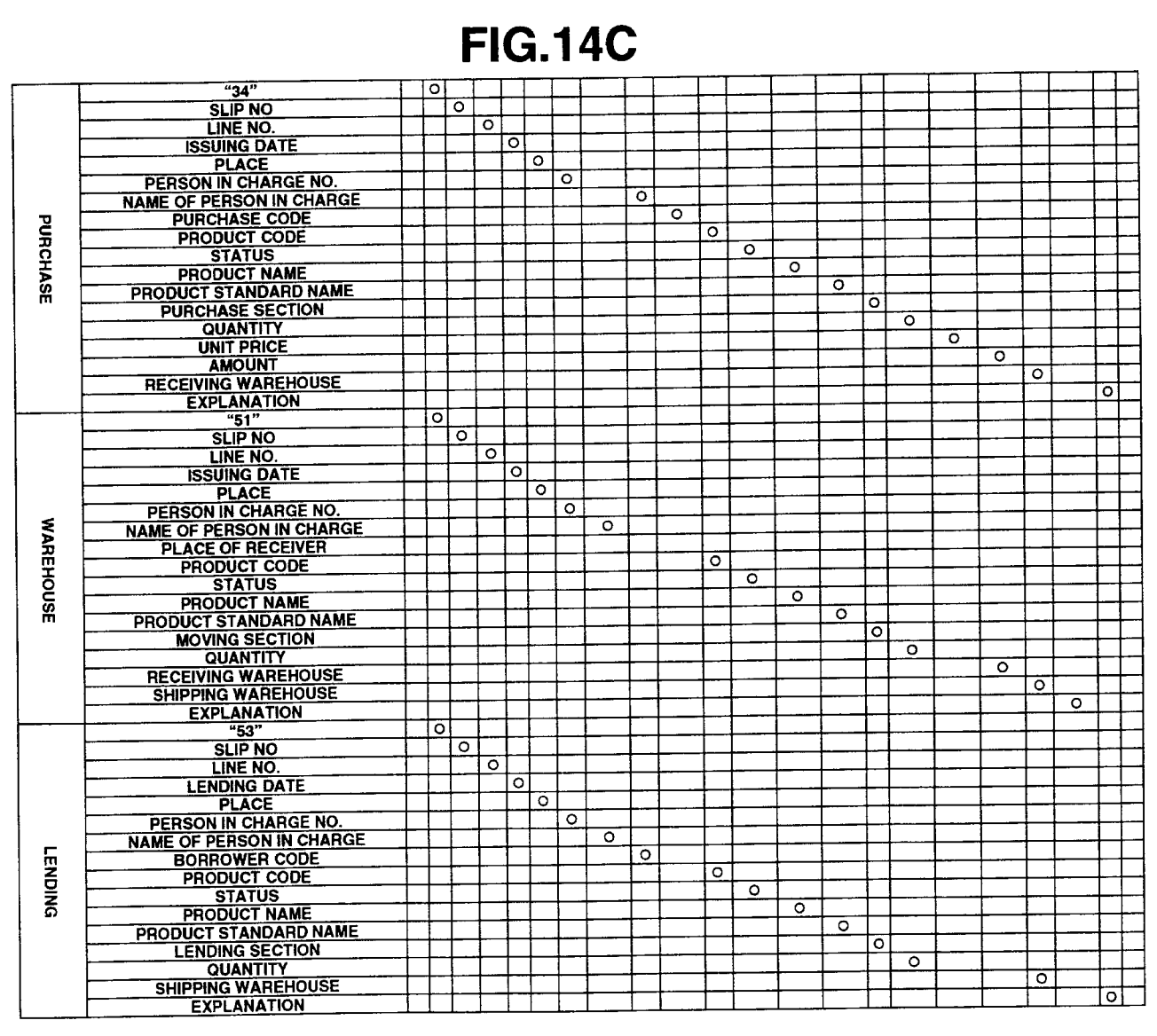

The file ID table shown in FIGS. 14B and 14C, which differs significantly in style from the file ID tables in FIGS. 11 to 13, is provided with columns for defining the file name of the operating schedule file 4 and its record item names in association with the tiles "ledger," "name" and "item name" in the horizontal direction and is provided with columns for defining the slip names of various slips and slip item names in association with the tiles "input ledger," "name" and "item name" in the vertical direction. In this case, the file name is written horizontally and the record item names are written vertically while the slip names are written vertically and the slip item names are written horizontally. Further the marks o are affixed to the intersections on the matrix where the record item names of the file cross the item names of various slips to indicate that the record item names are correlated with the slip item names. That is, the items without the mark o indicate that there is no such correlation.

The file ID table may take other structures as long as they provide better readability and better listing.

Although the form of the ledger registration slip is displayed or output as a file ID table in the above-described embodiment, the file ID table may be printed from the data processing apparatus. Further, a table previously printed on a predetermined sheet may be used as this file ID table.

Although this embodiment has been explained with reference to the case where a plurality of slip names are designated as the input ledger names in the file ID table and the case where a plurality of file names (ledger names) are designated, slip names and file names (ledger names) may be designated in combination as the input ledger name of one ledger registration slip or the input ledger names of the file ID table. The file processing operation in this case includes the processing which is performed based on the designated slip names and the processing which is performed based on the designated file names (ledger names), and those processes are as explained in the foregoing description of this embodiment.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data processing apparatus comprising:

a slip file for storing slip records each including item data corresponding to individual item names of the slip records;

a data file for storing data records in correspondence with individual item names of the data records;

a memory for storing a correlation table showing a correlation between individual item names of the slip records and individual item names of the data records to be processed at a time of renewal of the date records;

generating means for arranging, at renewal of the data records in the data file, the item data of each of the slip records in the slip file to correspond with an arrangement of each of the data records in the data file, in accordance with the correlation table stored in the memory, to thereby generate records for renewal; and renewal means for renewing the data records in the data file in accordance with the records for renewal generated by the generating means.

2. The data processing apparatus according to claim 1, further comprising outputting means for outputting, in accordance with the correlation table stored in the memory, a file identification table having a file name definition column for defining a file name of said data file, an item name definition column for defining individual item names in association with a record structure of said data file, a slip name definition column for defining a slip name of a slip record to be processed, and an item name definition column for defining individual item names of said slip record to be processed.

3. The data processing apparatus according to claim 1, wherein said memory also stores a renewal day and time, and wherein said renewal means writes a day and time of a performed renewal in said memory.

4. The data processing apparatus according to claim 1, wherein said memory further stores a number of registered records, and said renewal means renews a number of records and writes said renewed number of records in said memory.

5. A data processing apparatus comprising:
  a first data file for storing first data records in correspondence with individual item names of the first data records;
  a second data file for storing second data records in correspondence with individual item names of the second data records;
  a memory for storing a correlation table showing a correlation between individual item names of the first data records and the individual item names of the second records to be processed at a time of renewal of the second data records; and
  generating means for arranging, at renewal of the second data records in the second data file, the individual items of each of the first data records in the first data file to correspond with an arrangement of the second data records, in accordance with the correlation table stored in the memory, to thereby generate records for renewal; and
  renewal means for renewing the second data records in the second data file in accordance with the records for renewal generated by the generating means.

6. The data processing apparatus according to claim 5, further comprising outputting means for outputting, in accordance with said correlation table stored in said memory, a file identification table having a file name definition column for defining a file name of said data files, an item name definition column for defining individual item names in association with a record structure of said data files, a file name definition column for defining a file name of a data record to be processed, and an item name definition column for defining individual item names of said data record to be processed in association with a record structure of said data files.

7. The data processing apparatus according to claim 5, wherein said memory also stores a renewal day and time, and wherein said renewal means writes a day and time of a performed renewal in said memory.

8. The data processing apparatus according to claim 5, wherein said memory further stores a number of registered records, and said renewal means renews a number of records and writes said renewed number of records in said memory.

9. A file identification table for use in a data processing apparatus for performing file processing by associating a data file with a slip to be processed at a time of renewing records of said data file, and for showing a correlation between said data file and a plurality of slips, said file identification table comprising:
  a file name description column for describing a file name of said data file and an item name description column for describing individual item names in association with a record structure of said data file; and
  a slip name description column for describing slip names slip by slip in association with said plurality of slips, and an item name description column for describing item names of individual slips, slip by slip, in association with said plurality of slips.

10. The file identification table according to claim 9, further comprising a table name description column for describing an index table name indicative of indexing destinations of item data in association with said item name description column for said plurality of slips.

11. The file identification table according to claim 9, further comprising a definition description column for describing a generating condition for item data in association with said item name description column for said plurality of slips.

12. A file identification table for use in a data processing apparatus for performing file processing by associating a data file with a file to be processed at time of renewing records of said data file, and for showing a correlation between said data file and a plurality of files, said file identification table comprising:
  a first file name description column for describing a file name of said data file and an item name description column for describing individual item names in association with a record structure of said data file; and
  a second file name description column for describing file names for each file to be processed, in association with said plurality of files, and an item name description column for describing item names of individual files to be processed, file by file, in association with a record structure of each file to be processed.

13. The file identification table according to claim 12, further comprising a table name description column for describing an index table name indicative of indexing destinations of item data in association with said item name description column for said plurality of files.

14. The file identification table according to claim 12, further comprising a definition description column for describing a generating condition for item data in association with said item name description column for said plurality of files.

15. A recording medium readable by a computer, said recording medium encoding:
  setting means for causing the computer to set a correlation table showing a correlation between individual item names of a slip record stored in a slip file and individual item names of a data record in a data file to be processed at a time of renewal of the slip record;
  storing means for causing the computer to store the set correlation table;
  generating means for causing the computer to arrange, at renewal of the data record in the data file, the individual item names of the slip record stored in the slip file to correspond with the arrangement of the data record in the data file, in accordance with the correlation table, to thereby generate records for the renewal; and
  renewal means for causing the computer to renew the data record in the data file in accordance with the records for renewal generated by the generating means.

16. A recording medium readable by a computer, said recording medium encoding:
  setting means for causing the computer to set a correlation table showing a correlation between individual item names of a first record stored in a first file and individual item names of a second record in a second file to be processed at a time of renewal of the second record;

storing means for causing the computer to store the set correlation table;

generating means for causing a computer to arrange at renewal of the second record in the second file, the individual item names of the first record in the first file to correspond with the arrangement of the second record in the second file, in accordance with the correlation table, to thereby generate records for renewal; and renewal means for causing the computer to renew the second record in the second file in accordance with the records for renewal generated by the generating means.

* * * * *